(12) United States Patent
Macurek et al.

(10) Patent No.: US 7,997,475 B2
(45) Date of Patent: *Aug. 16, 2011

(54) SYSTEMS AND METHODS THAT INTEGRATE RADIO FREQUENCY IDENTIFICATION (RFID) TECHNOLOGY WITH INDUSTRIAL CONTROLLERS

(75) Inventors: Filip Macurek, Hostavice (CZ); Pavel Vrba, Plzen (CZ); Kenwood H. Hall, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 292 days.

This patent is subject to a terminal disclaimer.

(21) Appl. No.: 12/040,305

(22) Filed: Feb. 29, 2008

(65) Prior Publication Data

US 2009/0127325 A1 May 21, 2009

Related U.S. Application Data

(63) Continuation of application No. 10/985,621, filed on Nov. 10, 2004, now Pat. No. 7,339,476.

(51) Int. Cl.
*G06F 17/00* (2006.01)

(52) U.S. Cl. ..... 235/375; 235/491; 235/492; 340/572.1; 340/10.2; 209/3.3

(58) Field of Classification Search ............ 235/375, 235/491, 492; 340/572.1, 10.2; 209/3.3
See application file for complete search history.

(56) References Cited

U.S. PATENT DOCUMENTS

| | | |
|---|---|---|
| 2,999,499 A | 9/1961 | Willet |
| 3,858,212 A | 12/1974 | Tompkins et al. |
| 4,381,903 A | 5/1983 | Atkins |
| 4,722,372 A | 2/1988 | Hoffman et al. |
| 4,949,299 A | 8/1990 | Pickett et al. |
| 4,967,940 A | 11/1990 | Blette et al. |
| 5,300,875 A | 4/1994 | Tuttle |
| 5,461,666 A | 10/1995 | McMahan et al. |

(Continued)

FOREIGN PATENT DOCUMENTS

CN 1426546 A 6/2003

(Continued)

OTHER PUBLICATIONS

OA dated Aug. 21, 2009 for U.S. Appl. No. 11/239,959, 34 pages.

(Continued)

*Primary Examiner* — Michael G Lee
*Assistant Examiner* — Kristy A Haupt
(74) *Attorney, Agent, or Firm* — Turocy & Watson LLP; William R. Walbrun; John M. Miller

(57) ABSTRACT

The subject invention relates to systems and methods that provide electronic data (e.g., Electronic Product Code (EPC) data) obtained from Radio Frequency Identification (RFID) tags by RFID readers and/or from servers to one or more industrial components (e.g., controllers, programmable logic controllers, modules, etc.). The systems and methods employ component that processes, if desired, and stores received electronic data as records within a table. Processing includes filtering for data of interest and/or formatting the data in a suitable structure. Storage can include delineating related electronic data across rows the table and types of data across columns of a row. Upon receiving a subscription and/or request for electronic data from the one or more industrial components, the data can be retrieved and conveyed to the subscribing and/or requesting components.

20 Claims, 16 Drawing Sheets

U.S. PATENT DOCUMENTS

| | | | |
|---|---|---|---|
| 5,494,193 A | 2/1996 | Kirschner et al. |
| 5,613,228 A | 3/1997 | Tuttle et al. |
| 5,621,199 A | 4/1997 | Calari et al. |
| 5,629,981 A | 5/1997 | Nerlikar |
| 5,689,415 A | 11/1997 | Calotychos et al. |
| 5,701,127 A | 12/1997 | Sharpe |
| 5,703,347 A | 12/1997 | Reddersen et al. |
| 5,785,181 A | 7/1998 | Quartararo, Jr. |
| 5,798,693 A | 8/1998 | Engellenner |
| 5,822,714 A | 10/1998 | Cato |
| 5,874,724 A | 2/1999 | Cato |
| 5,874,896 A | 2/1999 | Lowe et al. |
| 5,905,249 A | 5/1999 | Reddersen et al. |
| 5,910,776 A | 6/1999 | Black |
| 5,947,167 A | 9/1999 | Bogen et al. |
| 5,949,335 A | 9/1999 | Maynard |
| 5,952,935 A | 9/1999 | Mejia et al. |
| 5,963,134 A | 10/1999 | Bowers et al. |
| 5,964,656 A | 10/1999 | Lawler, Jr. et al. |
| 5,971,587 A | 10/1999 | Kato et al. |
| 5,973,600 A | 10/1999 | Mosher, Jr. |
| 5,983,200 A | 11/1999 | Slotznick |
| 5,992,096 A | 11/1999 | De La Cerda et al. |
| 6,049,745 A | 4/2000 | Douglas et al. |
| 6,091,998 A | 7/2000 | Vasko et al. |
| 6,115,616 A | 9/2000 | Halperin et al. |
| 6,116,505 A | 9/2000 | Withrow |
| 6,121,878 A | 9/2000 | Brady et al. |
| 6,144,301 A | 11/2000 | Frieden |
| 6,150,948 A | 11/2000 | Watkins |
| 6,154,790 A | 11/2000 | Pruett et al. |
| 6,169,483 B1 | 1/2001 | Ghaffari et al. |
| 6,170,059 B1 | 1/2001 | Pruett et al. |
| 6,172,609 B1 | 1/2001 | Lu et al. |
| 6,205,362 B1 | 3/2001 | Eidson |
| 6,211,789 B1 | 4/2001 | Oldham et al. |
| 6,263,440 B1 | 7/2001 | Pruett et al. |
| 6,264,106 B1 | 7/2001 | Bridgelall |
| 6,265,976 B1 | 7/2001 | Roesner et al. |
| 6,272,321 B1 | 8/2001 | Bruhnke et al. |
| 6,275,681 B1 | 8/2001 | Vega et al. |
| 6,282,407 B1 | 8/2001 | Vega et al. |
| 6,282,455 B1 | 8/2001 | Engdahl |
| 6,285,295 B1 | 9/2001 | Casden |
| 6,286,762 B1 | 9/2001 | Reynolds et al. |
| 6,286,763 B1 | 9/2001 | Reynolds et al. |
| 6,293,467 B1 | 9/2001 | Reddersen et al. |
| 6,297,734 B1 | 10/2001 | Richardson et al. |
| 6,305,548 B1 * | 10/2001 | Sato et al. ............... 209/3.3 |
| 6,307,517 B1 | 10/2001 | Lee |
| 6,317,027 B1 | 11/2001 | Watkins |
| 6,318,636 B1 | 11/2001 | Reynolds et al. |
| 6,330,971 B1 | 12/2001 | Mabry et al. |
| 6,342,839 B1 | 1/2002 | Curkendall et al. |
| 6,353,406 B1 | 3/2002 | Lanzl et al. |
| 6,354,493 B1 | 3/2002 | Mon |
| 6,362,738 B1 | 3/2002 | Vega |
| 6,366,206 B1 | 4/2002 | Ishikawa et al. |
| 6,377,176 B1 | 4/2002 | Lee |
| 6,377,203 B1 | 4/2002 | Doany |
| 6,377,764 B1 | 4/2002 | Morris-Jones |
| 6,392,544 B1 | 5/2002 | Collins et al. |
| 6,400,272 B1 | 6/2002 | Holtzman |
| 6,400,372 B1 | 6/2002 | Gossweiler, III et al. |
| 6,401,936 B1 | 6/2002 | Isaacs |
| 6,409,401 B1 | 6/2002 | Petteroti et al. |
| 6,415,978 B1 | 7/2002 | McAllister |
| 6,429,776 B1 | 8/2002 | Alicot et al. |
| 6,445,297 B1 | 9/2002 | Nicholson |
| 6,445,969 B1 | 9/2002 | Kenney |
| 6,448,886 B2 | 9/2002 | Garber |
| 6,451,154 B1 | 9/2002 | Grabau |
| 6,476,708 B1 | 11/2002 | Johnson |
| 6,480,100 B1 | 11/2002 | Frieden et al. |
| 6,484,886 B1 | 11/2002 | Isaacs |
| 6,486,780 B1 | 11/2002 | Garber |
| 6,501,382 B1 | 12/2002 | Rehfus |
| 6,505,780 B1 | 1/2003 | Yassin et al. |
| 6,517,000 B1 | 2/2003 | McAllister et al. |
| 6,523,752 B2 | 2/2003 | Nishitani et al. |
| 6,529,880 B1 | 3/2003 | McKeen et al. |
| 6,547,040 B2 | 4/2003 | Goodwin, III |
| 6,549,064 B2 | 4/2003 | Bandy et al. |
| 6,554,187 B2 | 4/2003 | Otto |
| 6,563,425 B2 | 5/2003 | Nicholson et al. |
| 6,566,997 B1 | 5/2003 | Bradin |
| 6,585,165 B1 | 7/2003 | Kuroda et al. |
| 6,587,856 B1 | 7/2003 | Srinivasan et al. |
| 6,593,853 B1 | 7/2003 | Barrett et al. |
| 6,600,418 B2 | 7/2003 | Francis et al. |
| 6,607,123 B1 | 8/2003 | Jollifee et al. |
| 6,608,551 B1 | 8/2003 | Anderson et al. |
| 6,608,561 B2 | 8/2003 | Lawler, Jr. et al. |
| 6,612,495 B2 | 9/2003 | Reddersen et al. |
| 6,617,962 B1 | 9/2003 | Horwitz et al. |
| 6,621,417 B2 | 9/2003 | Duncan et al. |
| 6,622,567 B1 | 9/2003 | Hamel et al. |
| 6,641,042 B1 | 11/2003 | Pierenkemper et al. |
| 6,650,227 B1 | 11/2003 | Bradin |
| 6,664,897 B2 | 12/2003 | Pape et al. |
| 6,669,089 B2 | 12/2003 | Cybulski et al. |
| 6,672,512 B2 | 1/2004 | Bridgelall |
| 6,677,852 B1 | 1/2004 | Landt |
| 6,685,059 B2 | 2/2004 | Jones et al. |
| 6,687,293 B1 | 2/2004 | Loyer et al. |
| 6,693,539 B2 | 2/2004 | Bowers et al. |
| 6,700,533 B1 | 3/2004 | Werb et al. |
| 6,700,931 B1 | 3/2004 | Lee et al. |
| 6,707,376 B1 | 3/2004 | Patterson et al. |
| 6,712,276 B1 | 3/2004 | Abali et al. |
| 6,714,121 B1 | 3/2004 | Moore |
| 6,724,308 B2 | 4/2004 | Nicholson |
| 6,726,099 B2 | 4/2004 | Becker et al. |
| 6,745,008 B1 | 6/2004 | Carrender et al. |
| 6,747,560 B2 | 6/2004 | Stevens, III |
| 6,750,769 B1 | 6/2004 | Smith |
| 6,752,277 B1 | 6/2004 | Sempliner |
| 6,784,789 B2 | 8/2004 | Eroglu et al. |
| 6,784,813 B2 | 8/2004 | Shanks et al. |
| 6,791,603 B2 | 9/2004 | Lazo et al. |
| 6,793,127 B2 | 9/2004 | Alsafadi et al. |
| 6,802,659 B2 | 10/2004 | Cremon et al. |
| 6,808,116 B1 | 10/2004 | Eslambolchi et al. |
| 6,809,646 B1 | 10/2004 | Lee |
| 6,812,824 B1 | 11/2004 | Goldinger et al. |
| 6,812,838 B1 | 11/2004 | Maloney |
| 6,812,841 B2 | 11/2004 | Heinrich et al. |
| 6,816,817 B1 | 11/2004 | Retlich |
| 6,828,902 B2 | 12/2004 | Casden |
| 6,842,106 B2 | 1/2005 | Hughes et al. |
| 6,847,856 B1 | 1/2005 | Bohannon |
| 6,853,294 B1 | 2/2005 | Ramamurthy et al. |
| 6,853,303 B2 | 2/2005 | Chen et al. |
| 6,859,757 B2 | 2/2005 | Muehl et al. |
| 6,870,797 B2 | 3/2005 | Reasoner et al. |
| 6,873,260 B2 | 3/2005 | Lancos et al. |
| 6,878,896 B2 | 4/2005 | Braginsky et al. |
| 6,879,809 B1 | 4/2005 | Vega et al. |
| 6,888,459 B2 | 5/2005 | Stilp |
| 6,897,763 B2 | 5/2005 | Schulmerich et al. |
| 6,899,476 B1 | 5/2005 | Barrus et al. |
| 6,901,304 B2 | 5/2005 | Swan et al. |
| 6,903,656 B1 | 6/2005 | Lee |
| 6,917,291 B2 | 7/2005 | Allen |
| 6,918,541 B2 | 7/2005 | Knowles et al. |
| 6,929,412 B1 | 8/2005 | Barrus et al. |
| 6,935,560 B2 | 8/2005 | Andreasson et al. |
| 6,940,408 B2 | 9/2005 | Ferguson et al. |
| 6,943,678 B2 | 9/2005 | Muirhead |
| 6,943,688 B2 | 9/2005 | Chung et al. |
| 6,945,721 B2 | 9/2005 | Sato |
| 6,967,579 B1 | 11/2005 | Elizondo |
| 6,975,229 B2 | 12/2005 | Carrender et al. |
| 6,992,574 B2 | 1/2006 | Aupperle et al. |
| 6,999,955 B1 | 2/2006 | Horvitz |
| 7,023,342 B2 | 4/2006 | Corbett et al. |
| 7,036,729 B2 | 5/2006 | Chung |

| | | |
|---|---|---|
| 7,057,509 B2 | 6/2006 | Gualdi et al. |
| 7,061,379 B2 | 6/2006 | Chen et al. |
| 7,066,388 B2 | 6/2006 | He |
| 7,066,667 B2 | 6/2006 | Chapman et al. |
| 7,069,100 B2 | 6/2006 | Monette et al. |
| 7,073,712 B2 | 7/2006 | Jusas et al. |
| 7,075,412 B1 * | 7/2006 | Reynolds et al. ............ 340/10.2 |
| 7,079,023 B2 | 7/2006 | Haller |
| 7,084,769 B2 | 8/2006 | Bauer et al. |
| 7,091,861 B2 | 8/2006 | Scmidtberg et al. |
| 7,114,655 B2 | 10/2006 | Chapman et al. |
| 7,127,507 B1 | 10/2006 | Clark et al. |
| 7,135,976 B2 | 11/2006 | Neff et al. |
| 7,151,456 B2 | 12/2006 | Godfrey |
| 7,165,722 B2 | 1/2007 | Shafer et al. |
| 7,183,922 B2 | 2/2007 | Mendolia et al. |
| 7,187,288 B2 | 3/2007 | Mendolia et al. |
| 7,194,072 B2 | 3/2007 | Gamble |
| 7,195,159 B2 | 3/2007 | Sloan et al. |
| 7,197,279 B2 | 3/2007 | Bellantoni |
| 7,212,637 B2 | 5/2007 | Salisbury |
| 7,221,258 B2 | 5/2007 | Lane et al. |
| 7,230,730 B2 | 6/2007 | Owen et al. |
| 7,240,027 B2 | 7/2007 | McConnell et al. |
| 7,272,502 B2 | 9/2007 | Lee et al. |
| 7,292,963 B2 | 11/2007 | Bornhoevd et al. |
| 7,317,394 B2 | 1/2008 | Koh et al. |
| 7,336,153 B2 | 2/2008 | Malone et al. |
| 7,336,167 B2 | 2/2008 | Olsen, III et al. |
| 7,336,243 B2 | 2/2008 | Jo et al. |
| 7,339,476 B2 * | 3/2008 | Macurek et al. ............ 340/572.1 |
| 7,345,576 B2 | 3/2008 | Allen et al. |
| 7,373,087 B2 | 5/2008 | Shi et al. |
| 7,388,491 B2 | 6/2008 | Chand et al. |
| 7,389,921 B2 | 6/2008 | Lin et al. |
| 7,486,181 B2 | 2/2009 | Olsen et al. |
| 7,510,110 B2 | 3/2009 | Pietrzyk et al. |
| 7,520,429 B2 | 4/2009 | Koster |
| 7,551,081 B2 | 6/2009 | Vrba et al. |
| 7,616,117 B2 | 11/2009 | Streeb et al. |
| 7,720,438 B2 | 5/2010 | Rowse |
| 7,764,191 B2 | 7/2010 | Hall et al. |
| 2001/0000019 A1 | 3/2001 | Bowers et al. |
| 2001/0008390 A1 | 7/2001 | Berquist |
| 2001/0015760 A1 | 8/2001 | Fellegara et al. |
| 2002/0005774 A1 | 1/2002 | Rudolph et al. |
| 2002/0030597 A1 | 3/2002 | Muirhead |
| 2002/0067265 A1 | 6/2002 | Rudolph |
| 2002/0070862 A1 | 6/2002 | Francis et al. |
| 2002/0130778 A1 | 9/2002 | Nicholson |
| 2002/0143320 A1 | 10/2002 | Levin |
| 2002/0155843 A1 | 10/2002 | Bahl et al. |
| 2002/0165758 A1 | 11/2002 | Hind et al. |
| 2002/0167397 A1 | 11/2002 | Eroglu et al. |
| 2002/0185532 A1 | 12/2002 | Berquist et al. |
| 2003/0007473 A1 | 1/2003 | Strong et al. |
| 2003/0023337 A1 | 1/2003 | Godfrey et al. |
| 2003/0071731 A1 | 4/2003 | Jesme |
| 2003/0102367 A1 | 6/2003 | Monette et al. |
| 2003/0109951 A1 | 6/2003 | Hsiung et al. |
| 2003/0126103 A1 | 7/2003 | Chen et al. |
| 2003/0150908 A1 | 8/2003 | Pokorny et al. |
| 2003/0169149 A1 | 9/2003 | Ohki et al. |
| 2003/0203730 A1 | 10/2003 | Wan et al. |
| 2003/0210142 A1 | 11/2003 | Freathy et al. |
| 2003/0216969 A1 | 11/2003 | Bauer et al. |
| 2003/0225635 A1 | 12/2003 | Renz et al. |
| 2004/0008123 A1 | 1/2004 | Carrender et al. |
| 2004/0024570 A1 | 2/2004 | Muehl et al. |
| 2004/0024644 A1 | 2/2004 | Gui et al. |
| 2004/0032443 A1 | 2/2004 | Moylan |
| 2004/0046642 A1 | 3/2004 | Becker et al. |
| 2004/0061324 A1 | 4/2004 | Howard |
| 2004/0062294 A1 | 4/2004 | Clemens et al. |
| 2004/0066281 A1 | 4/2004 | Hughes et al. |
| 2004/0069851 A1 | 4/2004 | Grunes |
| 2004/0084526 A1 | 5/2004 | Knowles et al. |
| 2004/0095910 A1 | 5/2004 | Metts et al. |
| 2004/0108378 A1 | 6/2004 | Gatz |
| 2004/0124988 A1 | 7/2004 | Leonard et al. |
| 2004/0160324 A1 | 8/2004 | Stilp |
| 2004/0181467 A1 | 9/2004 | Raiyani et al. |
| 2004/0189443 A1 | 9/2004 | Eastburn |
| 2004/0220860 A1 | 11/2004 | Persky et al. |
| 2004/0252025 A1 | 12/2004 | Silverbrook et al. |
| 2005/0012613 A1 | 1/2005 | Eckstein et al. |
| 2005/0021369 A1 | 1/2005 | Cohen et al. |
| 2005/0028417 A1 | 2/2005 | Kim |
| 2005/0035849 A1 | 2/2005 | Yizhack |
| 2005/0040934 A1 | 2/2005 | Shanton |
| 2005/0052283 A1 | 3/2005 | Collins et al. |
| 2005/0058483 A1 | 3/2005 | Chapman et al. |
| 2005/0062603 A1 | 3/2005 | Fuerst et al. |
| 2005/0068179 A1 | 3/2005 | Roesner |
| 2005/0083180 A1 | 4/2005 | Horwitz |
| 2005/0088299 A1 | 4/2005 | Bandy et al. |
| 2005/0092825 A1 | 5/2005 | Cox et al. |
| 2005/0093678 A1 | 5/2005 | Forster et al. |
| 2005/0093703 A1 | 5/2005 | Twitchell |
| 2005/0099268 A1 | 5/2005 | Juels et al. |
| 2005/0110641 A1 | 5/2005 | Mendolia et al. |
| 2005/0135181 A1 | 6/2005 | Shionoiri et al. |
| 2005/0140511 A1 | 6/2005 | Bonnell et al. |
| 2005/0143026 A1 | 6/2005 | Bellantoni |
| 2005/0143916 A1 | 6/2005 | Kim et al. |
| 2005/0145688 A1 | 7/2005 | Milenkovic et al. |
| 2005/0149414 A1 | 7/2005 | Schrodt et al. |
| 2005/0154572 A1 | 7/2005 | Sweeney |
| 2005/0155213 A1 | 7/2005 | Eastin |
| 2005/0159913 A1 | 7/2005 | Ariyoshi et al. |
| 2005/0162256 A1 | 7/2005 | Kinoshita |
| 2005/0170784 A1 | 8/2005 | Ariyoshi et al. |
| 2005/0177423 A1 | 8/2005 | Swanson |
| 2005/0177466 A1 | 8/2005 | Willins |
| 2005/0179521 A1 | 8/2005 | Pillai et al. |
| 2005/0180566 A1 | 8/2005 | Ryal |
| 2005/0188095 A1 | 8/2005 | Gardiner et al. |
| 2005/0190098 A1 | 9/2005 | Bridgelall et al. |
| 2005/0192727 A1 | 9/2005 | Shostak et al. |
| 2005/0197775 A1 | 9/2005 | Smith |
| 2005/0200457 A1 | 9/2005 | Bridgelall et al. |
| 2005/0206552 A1 | 9/2005 | Friedrich |
| 2005/0206555 A1 | 9/2005 | Bridgelall et al. |
| 2005/0212660 A1 | 9/2005 | Hansen et al. |
| 2005/0212673 A1 | 9/2005 | Forster |
| 2005/0212676 A1 | 9/2005 | Steinberg |
| 2005/0219039 A1 | 10/2005 | Allen |
| 2005/0228528 A1 | 10/2005 | Farchmin et al. |
| 2005/0237162 A1 | 10/2005 | Hyde et al. |
| 2005/0240305 A1 | 10/2005 | Bogash et al. |
| 2005/0241548 A1 | 11/2005 | Muirhead |
| 2005/0253717 A1 | 11/2005 | Howarth et al. |
| 2005/0253718 A1 | 11/2005 | Droms et al. |
| 2005/0258955 A1 | 11/2005 | Gloekler et al. |
| 2005/0264401 A1 | 12/2005 | Haller et al. |
| 2005/0269407 A1 | 12/2005 | Harmon |
| 2006/0006231 A1 | 1/2006 | Anson et al. |
| 2006/0027658 A1 | 2/2006 | Genc et al. |
| 2006/0038077 A1 | 2/2006 | Olin et al. |
| 2006/0049250 A1 | 3/2006 | Sullivan |
| 2006/0053234 A1 | 3/2006 | Kumar et al. |
| 2006/0055508 A1 | 3/2006 | Kumar et al. |
| 2006/0060657 A1 | 3/2006 | Choong et al. |
| 2006/0071774 A1 | 4/2006 | Brown et al. |
| 2006/0097873 A1 | 5/2006 | Vrba et al. |
| 2006/0108411 A1 * | 5/2006 | Macurek et al. ............ 235/375 |
| 2006/0125653 A1 | 6/2006 | McQuade |
| 2006/0125694 A1 | 6/2006 | Dejanovic et al. |
| 2006/0145850 A1 | 7/2006 | Krstulich |
| 2006/0170565 A1 | 8/2006 | Husak et al. |
| 2006/0200256 A1 | 9/2006 | Mason et al. |
| 2006/0208859 A1 | 9/2006 | Hougen et al. |
| 2006/0232382 A1 | 10/2006 | Bauer et al. |
| 2006/0250248 A1 | 11/2006 | Tu et al. |
| 2006/0279412 A1 | 12/2006 | Holland et al. |
| 2007/0008073 A1 | 1/2007 | Poasevara |
| 2007/0013517 A1 | 1/2007 | Posamentier |
| 2007/0013519 A1 | 1/2007 | Chung et al. |

| | | | |
|---|---|---|---|
| 2007/0018820 A1 | 1/2007 | Chand et al. | |
| 2007/0035396 A1 | 2/2007 | Chand et al. | |
| 2007/0040681 A1 | 2/2007 | Jessup | |
| 2007/0055470 A1 | 3/2007 | Pietrzyk et al. | |
| 2007/0063029 A1 | 3/2007 | Brandt et al. | |
| 2007/0075128 A1 | 4/2007 | Hall et al. | |
| 2007/0075832 A1 | 4/2007 | Morse et al. | |
| 2007/0137531 A1 | 6/2007 | Muirhead | |
| 2007/0159311 A1 | 7/2007 | Schober | |
| 2007/0159331 A1 | 7/2007 | Zegelin | |
| 2007/0205860 A1 | 9/2007 | Jones et al. | |
| 2007/0205861 A1 | 9/2007 | Nair et al. | |
| 2008/0118378 A1 | 5/2008 | Baron et al. | |
| 2008/0278328 A1 | 11/2008 | Chand et al. | |
| 2009/0206154 A1 | 8/2009 | Pietrzyk et al. | |
| 2009/0243808 A1 | 10/2009 | Vrba et al. | |
| 2009/0254199 A1 | 10/2009 | Vrba et al. | |

FOREIGN PATENT DOCUMENTS

| | | |
|---|---|---|
| DE | 10314260 A1 | 10/2004 |
| EP | 1542105 A1 | 6/2005 |
| EP | 1 557 806 A2 | 7/2005 |
| EP | 1 657 609 A1 | 11/2005 |
| EP | 1 657 606 A1 | 5/2006 |
| EP | 1 750 185 A2 | 2/2007 |
| EP | 1 752 908 A2 | 2/2007 |
| EP | 1 772 812 A2 | 4/2007 |
| EP | 1 657 609 B1 | 3/2010 |
| WO | 0016289 | 3/2000 |
| WO | 0058752 | 10/2000 |
| WO | 0169516 | 9/2001 |
| WO | 01/82009 A2 | 11/2001 |
| WO | 02073523 | 9/2002 |
| WO | 02/101670 A2 | 12/2002 |
| WO | 03/056403 A | 7/2003 |
| WO | 03/056469 A | 7/2003 |
| WO | 2004/040387 A | 5/2004 |
| WO | 2005/045743 A | 5/2005 |
| WO | 2005098737 A2 | 10/2005 |
| WO | 2007 021648 A2 | 2/2007 |
| WO | 2007/030394 A | 3/2007 |
| WO | 2007/030544 A2 | 3/2007 |
| WO | 2007/030544 A3 | 3/2007 |
| WO | 2008063553 A2 | 5/2008 |

OTHER PUBLICATIONS

OA Dated Jul. 28, 2009 for U.S. Appl. No. 11/220,130, 32 pages.
OA dated Jul. 30, 2009 for U.S. Appl. No. 12/263,750, 65 pages.
OA Dated Aug. 26, 2009 for U.S. Appl. No. 11/241,421, 24 pages.
OA dated Sep. 21, 2009 for U.S. Appl. No. 11/190,143, 27 pages.
OA dated Oct. 27, 2009 for U.S. Appl. No. 11/230,758, 39 pages.
CN OA Dispatched Jul. 4, 2008 for Chinese Application No. 200610141407.1, 12 pages.
EPOA dated Mar. 19, 2009 for European Patent Application No. 05 776 159.5, 3 pages.
EPOA dated Aug. 20, 2008 for European Patent Application No. 05 776 159.5, 3 pages.
International Search Report dated May 17, 2006 for PCT Application No. PCT/EP2005/007878, 8 pages.
OA dated Jun. 4, 2009 for U.S. Appl. No. 11/185,114, 95 pages.
OA dated May 14, 2009 for U.S. Appl. No. 11/239,959, 37 pages.
OA Dated Aug. 8, 2008 for U.S. Appl. No. 11/241,421, 49 pages.
OA Dated Aug. 28, 2008 for U.S. Appl. No. 11/129,199, 28 pages.
OA Dated May 30, 2008 for U.S. Appl. No. 11/222,256, 60 pages.
OA Dated Apr. 28, 2008 for U.S. Appl. No. 11/220,130, 29 pages.
OA Dated Apr. 30, 2008 for U.S. Appl. No. 11/185,114, 80 pages.
Partial International Search Report dated Mar. 30, 2006, for PCT Application Serial No. PCT/EP2005/007878, 3 pages.
International Search Report dated May 17, 2006 for International Patent Application Serial No. PCT/EP2005/007878, 8 pages.
European Search Report dated Feb. 6, 2006 mailed Feb. 20, 2006 for European Patent Application Serial No. 10/985,173, 3 pages.
M. Karkkainen, et al.: "The product centric approach: a solution to supply network information management problems?" Computers in Industry, Elsevier Science Publishers. Amsterdam, NL, vol. 52, No. 2, Oct. 2003.
OA Dated Jan. 30, 2009 for U.S. Appl. No. 11/129,199, 32 pages.
OA Dated Nov. 28, 2008 for U.S. Appl. No. 11/239,959, 75 pages.
OA Dated Jan. 12, 2009 for U.S. Appl. No. 11/184,233, 359 pages.
OA Dated Mar. 19, 2009 for U.S. Appl. No. 11/220,130, 18 pages.
OA Dated Nov. 24, 2008 for U.S. Appl. No. 11/220,130, 36 pages.
OA Dated Sep. 18, 2008 for U.S. Appl. No. 11/190,143, 22 pages.
OA Dated Sep. 30, 2008 for U.S. Appl. No. 11/230,758, 63 pages.
OA Dated Feb. 6, 2009 for U.S. Appl. No. 11/241,421, 14 pages.
OA Dated Oct. 2, 2008 for U.S. Appl. No. 11/185,114, 42 pages.
International Search Report for PCT Application No. PCT/US06134721 mailed Apr. 26, 2007, 1 page.
OA Dated Apr. 16, 2009 for U.S. Appl. No. 11/230,758, 26 pages.
OA Dated Apr. 21, 2009 for U.S. Appl. No. 11/190,143, 19 pages.
European Search Report for European Patent Application Serial No. EP05024570, mailed Feb. 20, 2006, 3 Pages.
International Search Report for PCT Application Serial No. PCT/US06/34290, mailed Feb. 5, 2008, 2 pages.
CN OA due Apr. 1, 2008 for Chinese Patent Application No. 200510137387.6, 21 pages.
OA Dated Mar. 26, 2009 for U.S. Appl. No. 11/200,915, 70 pages.
European Search Report dated Nov. 20, 2009 for European Patent Application No. EP 06 80 3042, 7 pages.
OA dated Dec. 24, 2009 for U.S. Appl. No. 12/140,118, 76 pages.
OA dated Jan. 27, 2010, for U.S. Appl. No. 11/185,114, 88 pages.
OA dated Jan. 13, 2010 for U.S. Appl. No. 12/263,750, 16 pages.
OA dated Oct. 8, 2009 for U.S. Appl. No. 11/200,915, 41 pages.
Final OA mailed Mar. 1, 2010 for U.S. Appl. No. 11/239,959, 29 pages.
OA dated Apr. 15, 2010 for U.S. Appl. No. 11/241,421, 23 pages.
OA dated Mar. 1, 2010 for U.S. Appl. No. 11/239,959, 29 pages.
OA dated Jun. 23, 2010 for U.S. Appl. No. 12/040,305, 30 pages.
OA dated Jun. 18, 2010 for U.S. Appl. No. 12/140,118, 13 pages.
OA Dated Jul. 8, 2010 for U.S. Appl. No. 11/200,915, 52 pages.
International Search Report mailed Jun. 5, 2008 for PCT Application No. PCT/US2007/024049, 1 page.
European Search Report dated Jun. 9, 2008 for European Patent Application No. EP 06 02 0479, 2 pages.
International Search Report mailed Mar. 14, 2007 for PCT Application No. PCT/US2006/030751, 2 pages.
Partial European Search Report dated Nov. 3, 2008 for European Patent Application No. EP 06 01 5620, 5 pages.
OA dated Dec. 22, 2010 for U.S. Appl. No. 11/200,915 27 pages.
CN OA dated Aug. 13, 2010 for Chinese Application No. 200680029337.9, 19 pages.
Notice of Allowance dated Apr. 1, 2011 for U.S. Appl. No. 12/481,965, 81 pages.

* cited by examiner

SYSTEMS AND METHODS THAT INTEGRATE RADIO FREQUENCY IDENTIFICATION (RFID) TECHNOLOGY WITH INDUSTRIAL CONTROLLERS

RELATED APPLICATIONS

This application is a continuation of U.S. patent application Ser. No. 10/985,621 filed on Nov. 10, 2004 and entitled "SYSTEMS AND METHODS THAT INTEGRATE RADIO FREQUENCY IDENTIFICATION (RFID) TECHNOLOGY WITH INDUSTRIAL CONTROLLERS," which is also related to co-pending U.S. patent application Ser. No. 10/985,173 filed on Nov. 10, 2004 and entitled "SYSTEMS AND METHODS THAT INTEGRATE RADIO FREQUENCY IDENTIFICATION (RFID) TECHNOLOGY WITH AGENT-BASED CONTROL SYSTEMS," the entirety of which is incorporated herein by reference.

TECHNICAL FIELD

The subject invention relates to industrial control systems and, more particularly, to systems and methods that provide electronic product data to industrial control components.

BACKGROUND OF THE INVENTION

Industrial controllers are special purpose processing devices used for controlling (e.g., automated and semi-automated) industrial processes, machines, manufacturing equipment, plants, and the like. A typical controller executes a control program or routine in order to measure one or more process variables or inputs representative of the status of a controlled process and/or effectuate outputs associated with control of the process. Such inputs and outputs can be digital and/or analog, assuming a continuous range of values. A typical control routine can be created in a controller configuration environment that has various tools and interfaces whereby a developer can construct and implement a control strategy using industrial and conventional programming languages or graphical representations of control functionality. Such control routine can be downloaded from the configuration system into one or more controllers for implementation of the control strategy in controlling a process or machine.

Measured inputs received from a controlled process and outputs transmitted to the process can pass through one or more input/output (I/O) modules in a control system. Such modules can serve in the capacity of an electrical interface between the controller and the controlled process and can be located local or remote from the controller. Inputs and outputs can be recorded in an I/O memory. The input values can be asynchronously or synchronously read from the controlled process by one or more input modules and output values can be written directly to memory by a processor for subsequent communication to the process by specialized communications circuitry. An output module can interface directly with a controlled process by providing an output from memory to an actuator such as a motor, drive, valve, solenoid, and the like.

During execution of the control routine, values of the inputs and outputs exchanged with the controlled process can pass through memory. The values of inputs in memory can be asynchronously or synchronously updated from the controlled process by dedicated and/or common scanning circuitry. Such scanning circuitry can communicate with input and/or output modules over a bus on a backplane or network. The scanning circuitry can also asynchronously or synchronously write values of the outputs in memory to the controlled process. The output values from the memory can be communicated to one or more output modules for interfacing with the process. Thus, a controller processor can simply access the memory rather than needing to communicate directly with the controlled process.

In distributed control systems, controller hardware configuration can be facilitated by separating the industrial controller into a number of control elements, each of which performs a different function. Particular control modules needed for the control task can then be connected together on a common backplane within a rack and/or through a network or other communications medium. The control modules can include processors, power supplies, network communication modules, and I/O modules exchanging input and output signals directly with the controlled process. Data can be exchanged between modules using a backplane communications bus, which can be serial or parallel, or via a network. In addition to performing I/O operations based solely on network communications, smart modules exist which can execute autonomous logical or other control programs or routines. Various control modules of a distributed industrial control system can be spatially distributed along a common communication link in several locations. Certain I/O modules can thus be located proximate a portion of the controlled equipment, and away from the controller. Data can be communicated with these remote modules over a common communication link, or network, wherein all modules on the network communicate via standard communication protocols.

In a typical distributed control system, one or more I/O modules are provided for interfacing with a process. The outputs derive their control or output values in the form of a message from a master or peer device over a network or a backplane. For example, an output module can receive an output value from a processor via a communications network or a backplane communications bus. The desired output value is generally sent to the output module in a message. The output module receiving such a message will provide a corresponding output (analog or digital) to the controlled process. Input modules measure a value of a process variable and report the input values to another device over a network or backplane. The input values can be used by a processor for performing control computations.

As noted above, industrial controllers can be utilized to control systems, machines, processes, etc. in the industrial automation and manufacturing environment. An evolving technology that is gaining more and more interest in this environment is Radio Frequency Identification (RFID), which leverages electronic data to mitigate scanning bar codes and/or opening containers to obtain product information. Suitable electronic product data can include Electronic Product Code (EPC) data as well as other product related data. A typical EPC is a unique number bit-encoded and embedded in an RFID tag (a small silicon chip with one or more antennas) affixed to an associated product. An RFID reader is a device that can be utilized to read and/or write RFID tag data, depending on read/write privileges. For example, an RFID reader can be utilized to read EPC and/or electronic data from an RFID tag via wireless (e.g., radio frequency (RF)) communication and/or write EPC and/or electronic data to an RFID tag. Electronic product data read from an RFID tag can be utilized to provide a greater degree of certainty over what goes into a supply chain and/or how to manage raw materials, warehouse inventory, shipments, logistics, and/or various other aspects of manufacturing. However, conventional systems that employ RFID technology generally convey electronic product data obtained by RFID readers from RFID tags to a PC based server that performs data filtering and management and provides interfaces to other industrial applications. Thus, there is a need to provide techniques that integrate RFID technology with industrial controllers.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later.

The systems and methods of the subject invention provide novel techniques that integrate Radio Frequency Identification (RFID) technology with industrial controllers. The systems and methods provide for receiving electronic data such as Electronic Product Code (EPC) data or other product data from the physical RFID reader(s) and/or a server (e.g., Savant-like). Electronic data from RFID readers is received by RFID reader interfaces via vendor specific plug-ins, and electronic data from RFID related servers is received by server interfaces. The electronic product data can be filtered to discriminate between data of interest and other data and to mitigate receiving duplicate data, processed (e.g., where the EPC data is raw data) to a suitable format, and stored. Such storage can include delineating the electronic data across rows and columns of a table. Where the electronic product data includes EPC data, the table can store EPC code, logical reader, timestamps, various flags, etc. Stored data can be provided to one or more PLCs, controllers, modules, control applications, ERPs, MESs, and/or MCs, for example, upon receiving a subscription and/or request for such data. In addition, historical electronic product data and/or signal quality information associated with electronic product data can obtained and provided to a PLC, ERP, MES, and/or MC.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
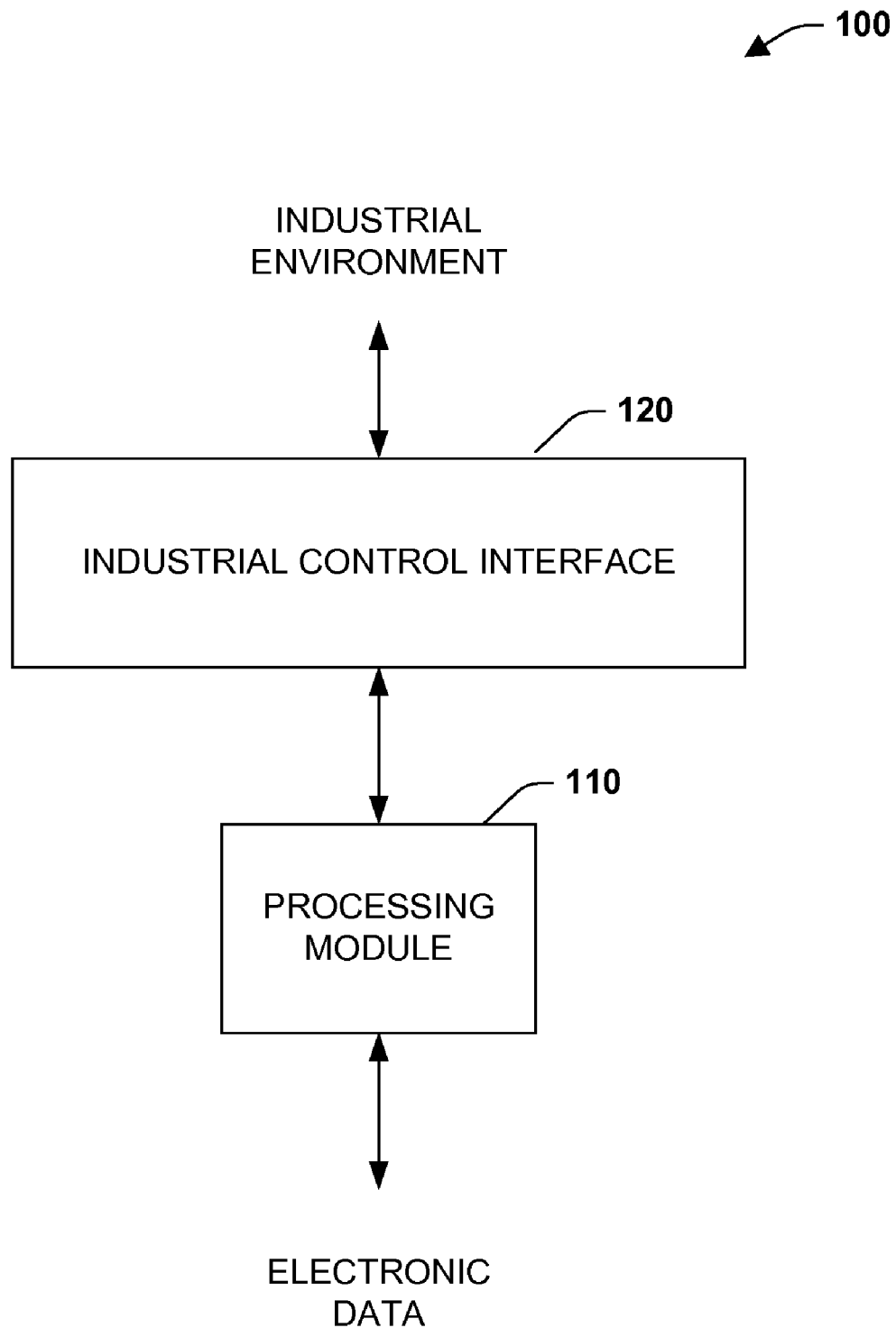
FIG. 1 illustrates an exemplary system that facilitates electronic data exchange within an industrial environment.

As utilized in this application, terms "component," "object," "module," "system," "controller," "device," and variants thereof are intended to refer to a computer-related entities, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers.

The subject invention facilitates distribution of electronic product data such as Electronic Product Code (EPC) data to PLCs, controllers, modules, control applications, ERPs, MESs, and/or MCs, for example. The systems and methods integrate Radio Frequency Identification (RFID) technology with such industrial components. Electronic data residing in RFID tags can be received through RFID reader interfaces employing various vendor specific plug-ins, and electronic data residing in a server can be received through server interfaces. Received electronic product data can be filtered, processed, and stored, for example, as records in a table. Stored data can be provided to one or more PLCs, controllers, modules, control applications, ERPs, MESs, and/or MCs, for example, upon receiving a subscription and/or request for such data. In addition, historical electronic product data and/or signal quality information associated with electronic product data can obtained and provided to a PLC, ERP, MES, and/or MC.

The subject invention is described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 that facilitates electronic data exchange within an industrial environment. The system 100 includes a processing module 110 that exchanges electronic data with entities within industrial environment that store and/or convey electronic data. For example, the processing module 110 can exchange electronic data with various readers, writers, servers, storage components, etc. Such data can include unprocessed (e.g., raw data) and/or processed (e.g., filtered and formatted) electronic data. In addition, suitable electronic data can be compressed, encrypted, encoded, modulated within a carrier envelope, protected (e.g., password), etc. and conveyed as a data stream, one or more data bursts and/or one or more data packets, for example.

In one instance, the electronic data can be electronic product data (e.g., Electronic Product Code (EPC) data and other data associated with the product). Such data can be obtained from a Radio Frequency Identification (RFID) tag affixed to the product and read by devices such as RFID readers and/or stored in related servers. The communications channel between the processing module 110 and these devices can be through essentially any wire and/or wireless channel, including Ethernet (e.g., 10 BASE-T, 100 BASE-T and 1000 BASE-T), serial port (e.g., RS-232 and RS-422), parallel port, coaxial cable, Infrared (IR), BlueTooth, Universal Serial Bus (USB), Firewire, and the like. In addition, the processing module can employ various interfaces to receive data from different sources (e.g., different device models, manufacturers, vendors, software revisions, etc.).

The processing module 110 can receive pushed and/or pulled data. In one example, a reader can periodically transmit or emit electronic data to the processing module 110, which can accept or reject the electronic data, for example, based on whether the electronic data is data of interest to the industrial environment. Such data discrimination can be facilitated by filters or other software and/or hardware that pass and/or reject data. Alternatively and/or additionally, intelligence can be utilized to facilitate selection of suitable electronic data. In this instance, the intelligence can employ machine learning techniques that utilize statistics, probabilities, inferences, classifiers, etc. to render a decision as to whether electronic data should be accepted. In another example, the processing module 110 can transmit a message that indicates it is ready to receive electronic data. In yet another example, the processing module 110 can query electronic data, for example, from one or more other components, servers and/or databases.

The processing module 110 can operate on received electronic data. For example, the processing module 110 can filter, parse, and/or format electronic data. In addition, the processing module 110 can selectively extract and/or discard portions of the electronic data. Where the data is compressed, encrypted, encoded, modulated, protected, etc. the processing component 110 can act on the electronic product data in this state and/or decompress, decrypt, decode, demodulate, unprotect, etc. the data prior to acting on it. In addition, the processing module 110 can store the electronic data, for example, within local and/or remote storage components. For example, the processing module 110 can include various volatile and/or non-volatile memory that can be utilized to store the electronic data. Alternatively and/or additionally such memory can reside remote from the processing module 110.

It is to be appreciated that the electronic data can be variously stored. For example, the data can be stored in records of a database, one or more binary files, one or more ASCII files, etc. Stored electronic data can be conveyed to an industrial control interface 120, which can provide communication interfaces to convey at least a portion of the electronic data to one or more entities within the industrial environment (e.g., industrial controllers). Such interfaces can include essentially any interface, including subscribe and query based interfaces that enable an entity to subscribe to receive electronic product data and/or a signal quality indicator when such data becomes available and/or query saved electronic data.

It is to be appreciated that the system 100 can be integrated within one or more control systems. In one instance, the system 100 can reside and execute within an entity of a control system. In another instance, the system 100 can be an additional component that facilitates electronic data exchange as described herein. It is to be appreciated that the processing component 110 and/or the industrial control interface 120 can be software and/or hardware based. For example, these components can be implemented in essentially any programming language, such as, for example, C, C++, C# or Java based languages. In addition, a markup language such as Extensible Markup Language (XML) and/or Physical Markup Language (PML) can be utilized to define a system configuration, which can include information on mapping between logical-physical readers, available filters, etc.

Figure 2:
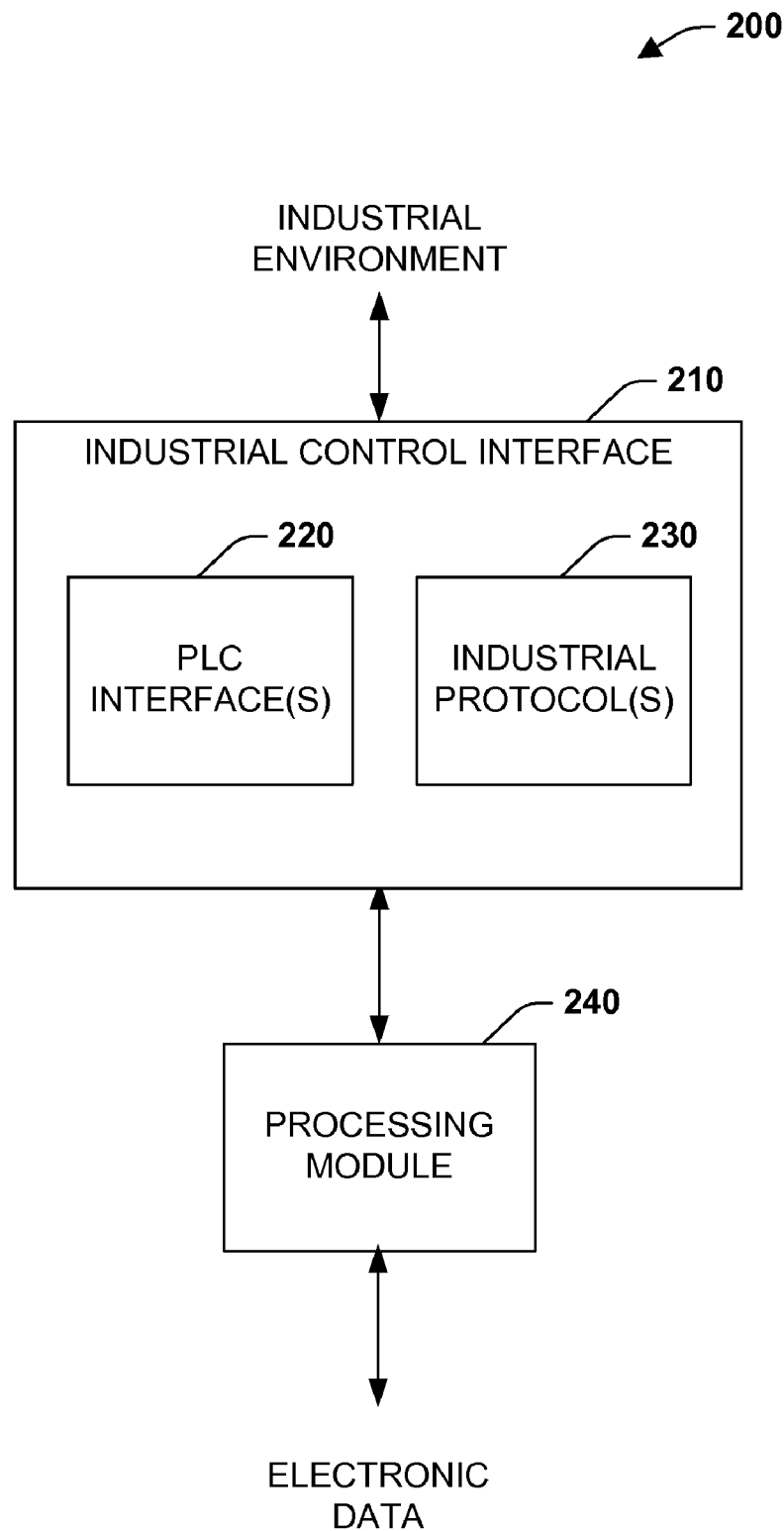
FIG. 2 illustrates an exemplary system that provides electronic data to entities within an industrial environment.

FIG. 2 illustrates a system 200 that provides electronic data to entities within an industrial environment. The system 200 includes an industrial control interface 210 that is utilized to communicate with industrial systems such as Enterprise Systems (ERPs), Manufacturing Execution Systems (MESs), Machine Control Systems (MCs), agent-based control systems, and the like, and components such a industrial controllers, programmable logic controllers, and/or industrial modules. As depicted, the industrial control interface can include one or more PLC interfaces 220 and one or more industrial protocols 230. The one or more PLC interfaces 220 provide a mechanism for the industrial control interface 210 to exchange electronic data with an industrial controller, a PLC, etc. without having to utilize any industrial control protocol. For example, the industrial control interface 210 can be utilized to directly write to and/or read from I/O, tags, and/or memory (e.g., registers, buffers, RAM, cache, portable, etc.).

The one or more industrial protocols 230 provide various communication protocols for communication with industrial systems (e.g., ERPs, MESs, MCs, agent-based systems, etc.) and/or components (e.g., controllers, programmable logic controllers, modules, etc.). For example, the one or more industrial protocols 230 can include Control and Information Protocol (CIP) protocols for communicating via DeviceNet, ControlNet, EtherNet/IP, and/or Controller Area Network (CAN), fieldbus protocols for communicating via Profibus, Interbus-S, RIP, P-Net, and AS-i, Transport Control Protocol (TCP) and Internet Protocol (IP) for communicating via the Internet, NetBios Extended User Interface (NetBEUI) for communicating via Large and Wide Area Networks (LANs and WANs), File Transfer Protocol (FTP) for communicating with workstations, servers and the like, Hyper Text Transfer Protocol (HTTP) for communicating via the World Wide Web (WWW), etc.

The industrial control interface 210 can read electronic data from an industrial systems and/or component and convey the data to a processing module 240, which can store and/or provide the data to other entities. For example, the processing module 240 can provide the electronic data to a reader, which can write the data to a RFID tag on a product and/or a server. In another example, the processing module 240 can directly provide the data to the server. In addition, the industrial control interface 210 can be utilized to transfer electronic data from the processing module 240 to one or more industrial systems and/or components. Such data can be obtained from an RFID product tag. Such data can be received as unprocessed or processed data and compressed, encrypted, encoded, modulated within a carrier envelope, protected (e.g., password), etc. In addition, the electronic data can be received as a data stream, one or more data bursts and/or one or more data packets via wire and/or wireless technologies. Moreover, the data can include EPC as well as other electronic data.

Received electronic product data can be processed and stored by the processing module 240. Processing can include determining data of interest, wherein such data can be subsequently stored while other data is discarded; formatting the data, for example, prior to saving it; decompressing the data, decrypting the data, decoding the data, demodulating the data, unprotecting the data, transforming the data, etc. In one example, the data can be parsed by various characteristics and stored in a structured format. For example, similar data can be grouped and stored in a logical manner and/or a form suitable to the industrial systems and/or components. For example, the electronic data can be stored within rows and columns of a table. The stored data can be conveyed to the industrial systems and/or components through via the industrial control interface 210. Conveyance of the stored data can be based on a subscription and/or query by the industrial systems and/or components for the data. The system 200 can be integrated in one or more industrial systems within an entity of a system or as an additional component, as described in connection with the system 100 of FIG. 1.

Figure 3:
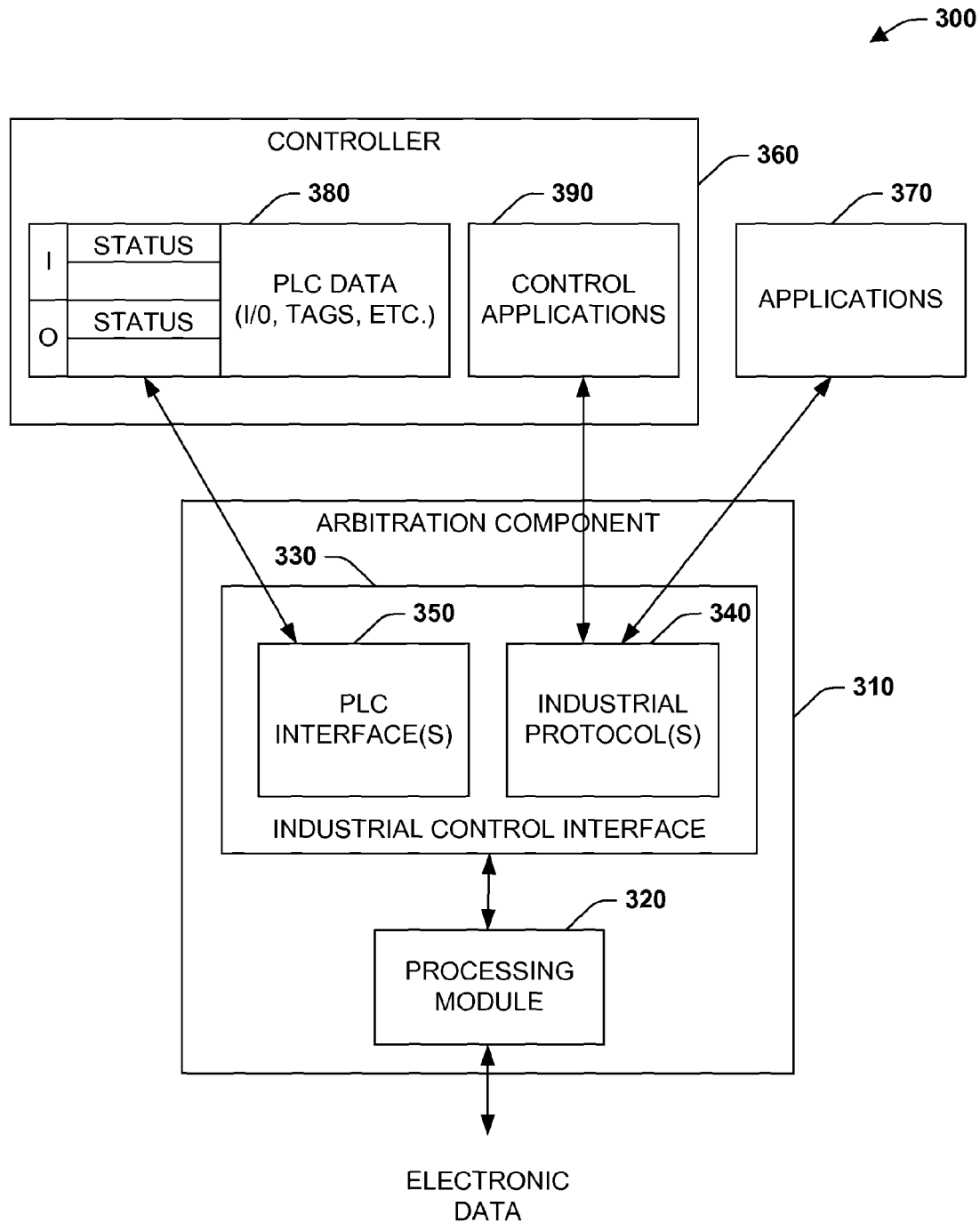
FIG. 3 illustrates an exemplary system for exchanging electronic data with industrial systems and/or components.

FIG. 3 illustrates an industrial control system 300. The system 300 includes an arbitration component 310 that exchanges electronic data between industrial systems and/or components and product tags that store product related information. The arbitration component 310 includes a processing module 320 and an industrial control interface 330. The processing module 320 can be substantially similar to the processing modules 110 and 240 described previously in connection with FIGS. 1 and 2, respectively. Likewise, the industrial control interface 330 can be substantially similar to industrial control interfaces 120 and 210 described previously in connection with FIGS. 1 and 2, respectively. For example, the industrial control interface 330 can include one or more protocols 340 that facilitate data exchange with industrial systems (e.g., ERPs, MESs, MCs, agent-based control systems, etc.) and/or components (e.g., controllers, PLCs, modules, etc.) and one or more PLC interfaces 350 that facilitate data exchange with I/O, tags, memory, etc. of an industrial controller, PLC, module, etc. Examples of suitable protocols include CIP, fieldbus, TCP, IP, NetBEUI, FTP, HTTP, etc.

As depicted, the arbitration component 310 communicates with a controller 360 and one or more applications 370. The controller 360 includes a data region 380 and one or more control applications 390. The arbitration component 310 can utilize the one or more PLC interfaces 350 to read and/or write parameters in the data region 380. Such parameters can include I/O, status, and/or state data, for example. In addition, the arbitration component 310 can utilize the one or more industrial protocols 340 to exchange data with the control applications 390 of the controller 360. The control applications 390 can be programmed in essentially any programming language. Examples of suitable languages include industrial control languages (e.g., structured text (ST), sequential function chart (SFC), functional block diagram (FBD), instruction list (IL), and ladder diagram (LD)), C, C++, C#, Graphical Motion Language (GML), Java, Flow-Charts, etc., and/or any combination thereof. Moreover, the arbitration component 310 can utilize the one or more industrial protocols 340 to exchange electronic data with the applications 370, which can include essentially any application residing outside of the controller 360.

As described herein, the data communicated with the arbitration component 310 can be associated with electronic data obtained from a reader (e.g., RFID), a server, an RFID tag, or other component, wherein the electronic data can include EPC data (e.g., EPC code, logical reader, timestamp, signal quality indicator, various flags, etc.), product type, date of manufacture, lot number, and/or associated cases, pallets, and/or container levels, for example. The arbitration component 310 is depicted as an individual component within the system 300; however, it is to be appreciated that the arbitration component 310 can execute within the controller 360 and/or other entity of an industrial system. In addition, the arbitration component 310 can execute within a personal computer, a laptop, a human interface machine, a handheld computer, a workstation, an agent, a hardware module, a software module, firmware, a state machine, a microprocessor, a PDA, a smart phone, a mobile phone, etc. Moreover, the arbitration component 310 can be distributed and/or execute across industrial systems in a distributed environment.

In one aspect of the invention, the arbitration component 310 exchanges data with the controller 360 and/or applications 370 based on a subscription and/or query. For example, the controller 360 and/or any of the applications 370 can employ a Subscribe Interaction Protocol (e.g., FIPA, ACS/JDL, etc.) to subscribe to the arbitration component 310 to receive electronic data when such data arrives, a signal quality indicator associated with received electronic data, and/or other environmental information. The signal quality indicator and/or the other environmental information can be utilized to resolve the source of the electronic data (e.g., an RFID tag) and the location thereof. In another example, the controller 360 and/or applications 370 can request (e.g., query) the arbitration component 310 for historical information such as electronic data read within a particular time period (e.g., between timestamps), signal quality indicators read within a particular time period (e.g., between timestamps), timestamps corresponding to particular electronic data, signal quality indicators corresponding to a particular electronic data, etc. Such data can be provided by the arbitration component 310 to a subscriber(s) and/or requestor(s) as a list of records as described in detail below.

Figure 4:
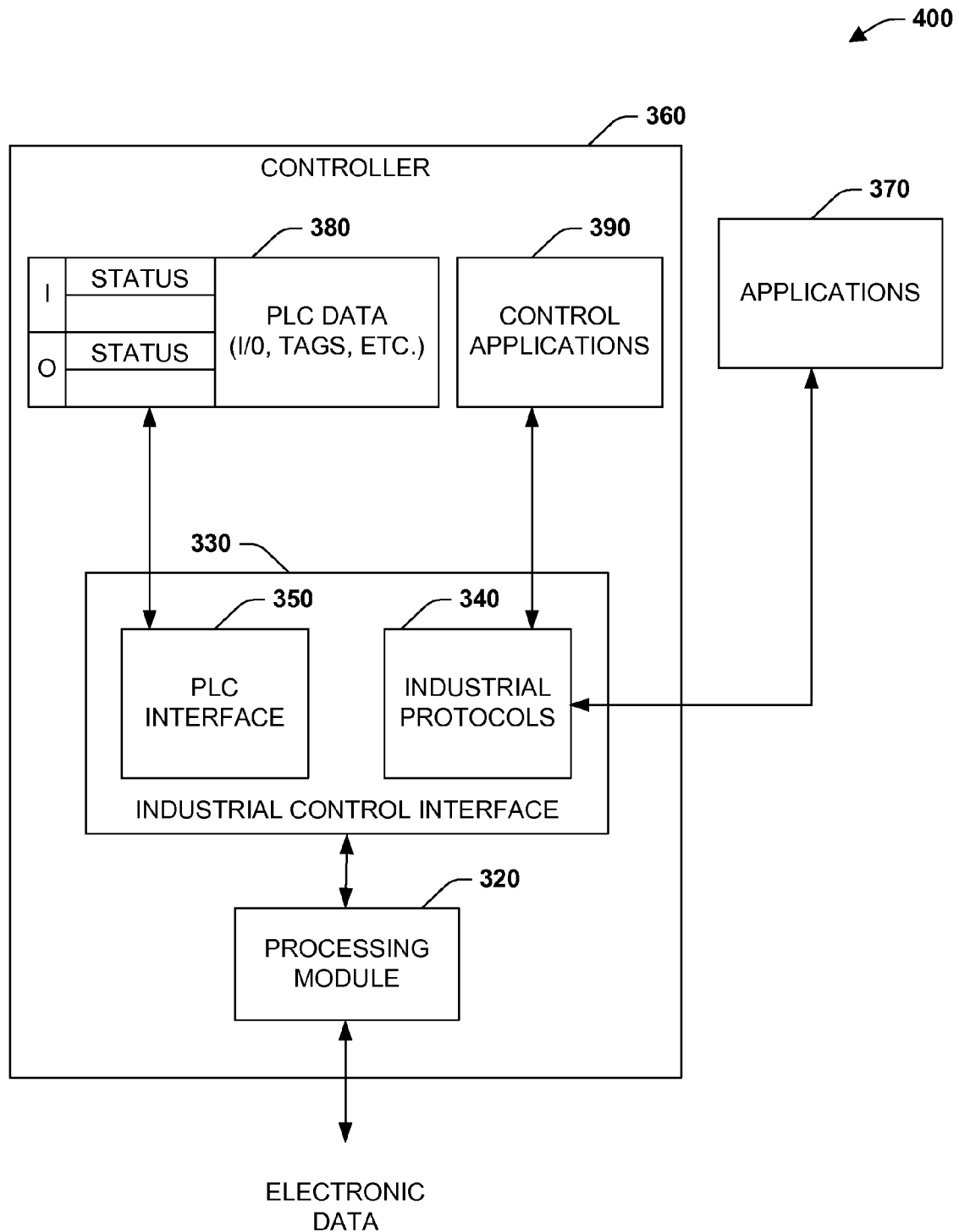
FIG. 4 illustrates an exemplary system that executes within a PLC and facilitates electronic product data distribution.

FIG. 4 illustrates a system 400, which is an alternative configuration of the system 300. In system 300, the processing module 320 and the industrial control interface 330 execute within the arbitration component 310, whereas in the system 400 the processing module 320 and the industrial control interface 330 execute within the controller 360. In another configuration (not shown), the arbitration component 310 can execute within the controller 360.

Figure 5:
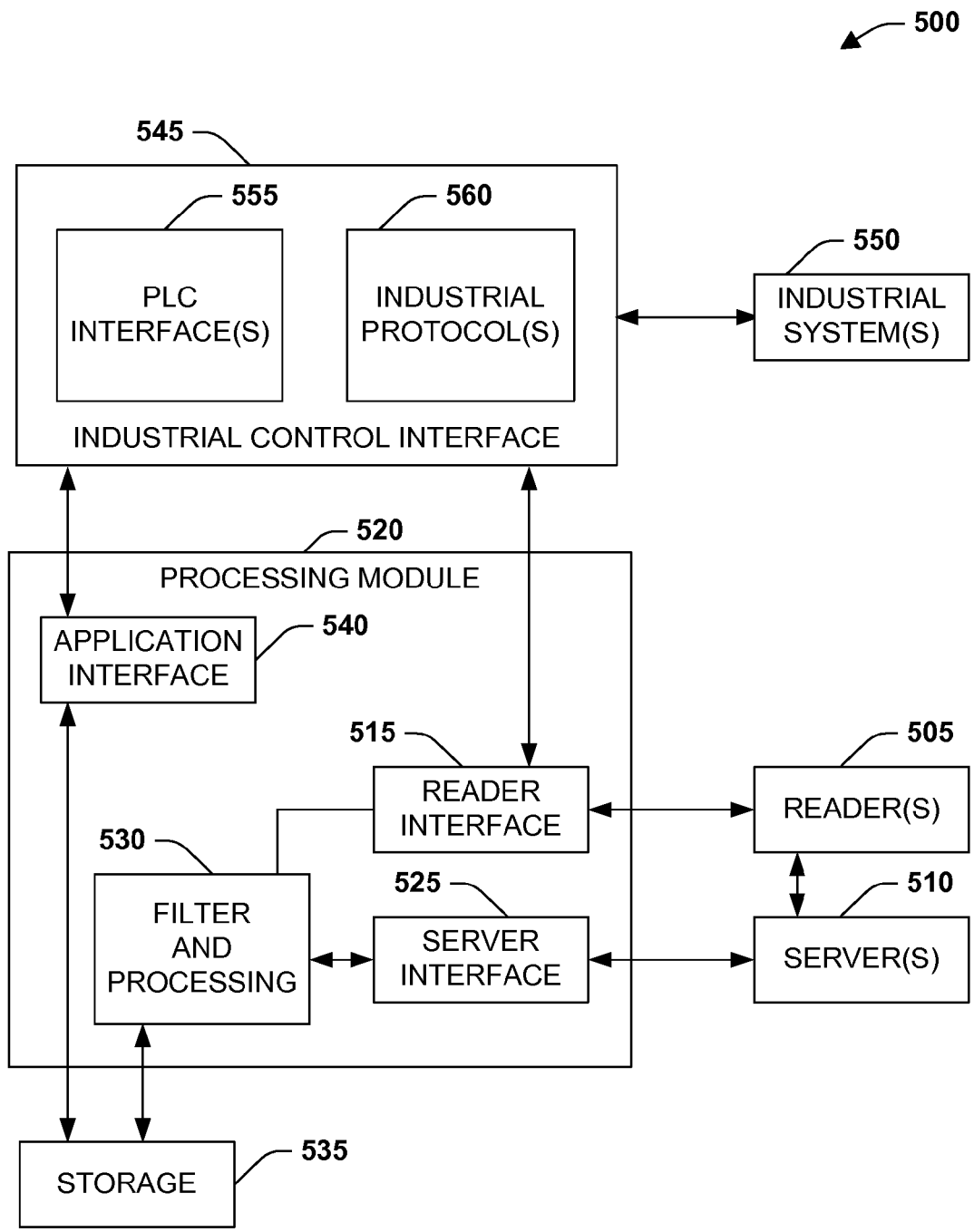
FIG. 5 illustrates an exemplary system that distributes electronic data obtained from readers to one or more industrial control systems.

FIG. 5 illustrates an industrial control system 500. The system 500 includes a plurality of readers 505 that receive electronic data (e.g., EPC data) from RFID tags within one or more antenna range coverage areas of the readers 505. The readers 505 can convey the electronic data to one or more servers 510, which can filter, process and/or store the data and/or a reader interface 515 of a processing module 520. The electronic data can be received by the reader interface 515 through an RFID Reader Driver Plug-in. It is to be appreciated that the reader interface 515 can employ one or more plug-ins (e.g., RFID Reader Driver Plug-ins) to facilitate communication with various readers. For example, each of the readers 505 can be associated with a plug-in and associated protocol, which can correspond to a manufacturer or vendor of the reader, the reader model, the reader software revision, etc. The reader interface 515 can utilize various communication channels such as Ethernet, serial port, Firewire, USB, parallel port, etc. in connection with suitable communication protocols (e.g., generic and reader dependent protocols). Electronic data from the one or more servers 510 can be received by a server interface 525 of a processing module 520. As noted above, the electronic data can obtained from an RFID tag. Such tags can be formed from a chip (e.g., silicon, germanium, etc.) and one or more antennas, encoded with product related data, and affixed to a product.

The processing module 520 further includes a filter and processing component 530 that can be utilized to process raw electronic data received through the reader interface 515 and/or the sever interface 525. The filter and processing component 530 can be utilized to discriminate between electronic data, for example, to recognize and store particular data, while discarding other data. Typically, electronic data received through the server interface 525 is processed and does not require further filtering and/or processing; however, such data may be unprocessed or additional filtering and/or processing may be desired. The filter and processing component 530 can convey the data to a storage component 535, which can include local and/or remote volatile and/or nonvolatile memory.

An application interface 540 of the processing component 520 can be utilized to transfer electronic data stored in the storage component 535 through an industrial control interface 545 to an industrial control system 550. For example, a control application can of the industrial system 550 can subscribe to receive electronic data whenever an RFID tag enters and/or leaves a coverage area of the readers 505. In another example, the control application can query, or request, electronic data. In one instance, such request can be for historical electronic product data. For example, the historical data can be related to unique codes and/or a signal quality indicator read within a specific period of time and/or timestamps and/or signal quality indicators corresponding to particular electronic data. This information can be conveyed to the control application of the industrial system 550 as a list of records or other format. In addition, PLC plug-ins 555 and/or industrial protocols 560 can be employed to facilitate communication with the industrial control system 550.

Figure 6:
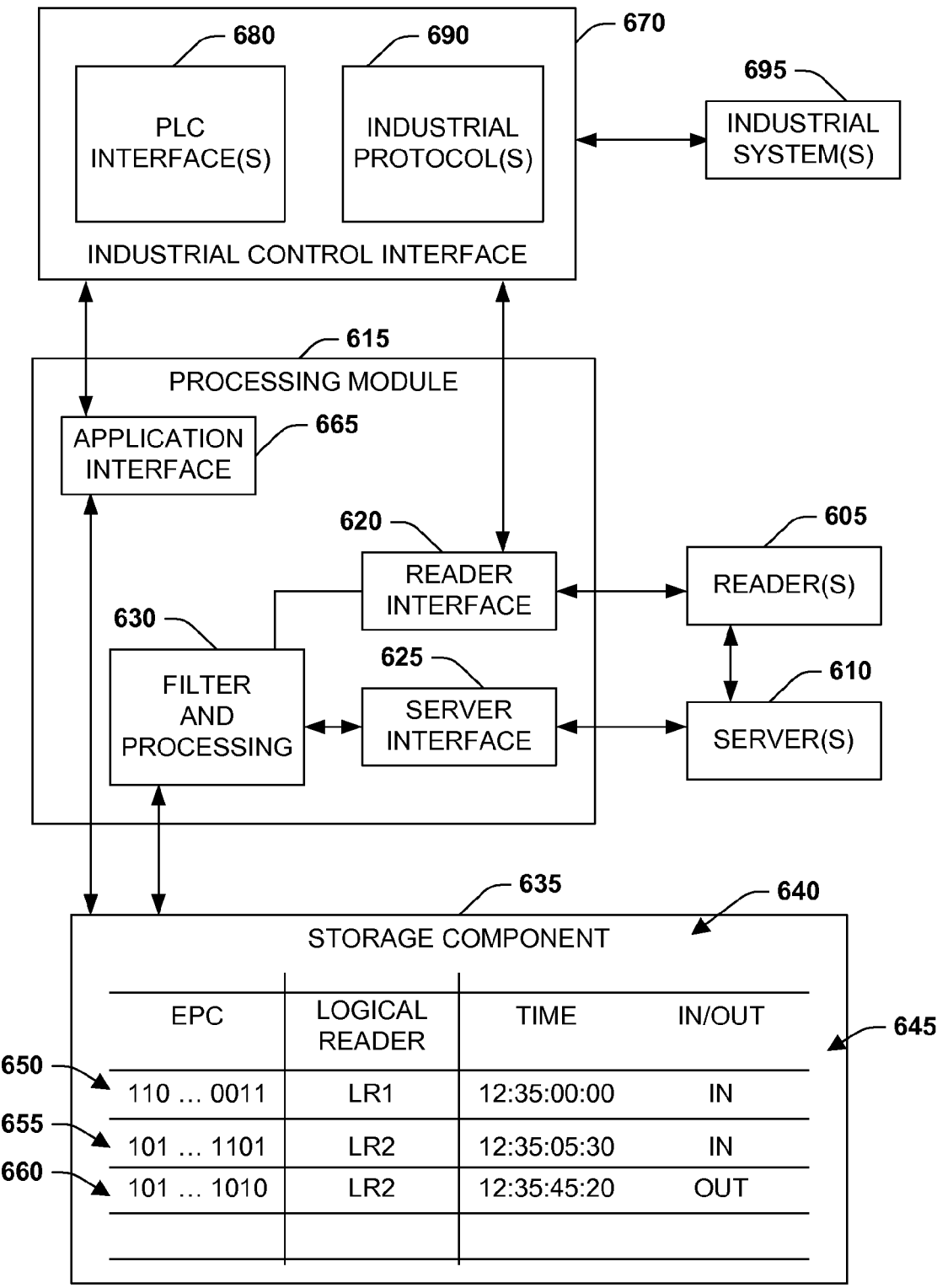
FIG. 6 illustrates an exemplary system that collects electronic data from RFID tags, stores the data within a table, and distributes the data to industrial systems.

FIG. 6 illustrates an industrial control system 600 that collects electronic data from RFID tags, stores the data within a table, and distributes the data to industrial systems. The system 600 includes a plurality of RFID readers 605 and a plurality of server 610 that provides electronic data to a processing module 615. In general, the electronic data obtained from the plurality of readers 605 is received by a reader interface 620 of the processing module 615, and electronic data from the server 610 is received by a server interface 625 of the processing module 615. The electronic data can be processed and/or raw data and communicated through various communication channels and protocols as described herein. Received electronic data is conveyed by the reader interface 620 and/or the server interface 625 to a filter and processing component 630, wherein the data can be filtered and/or processed, if desired, for example, to selectively accept data and format raw data.

The electronic data is conveyed by the filter and processing component 630 to a storage component 635, which is depicted as a two dimensional table. However, it is to be appreciated that this example is illustrative and not limitative, and that essentially any technique for storing data can be employed in accordance with aspects of the invention. For example, the table can be a database of records (e.g., records within a table, in-memory database and a simple DB system). In addition, essentially any number of rows and columns can be utilized to store the data, and the table can be one, two, three, four, . . . , N dimensional, wherein N is an integer equal to or greater than one. As depicted, the storage component 635 includes a plurality of columns 640 and a plurality of rows 645 in which electronic data is stored. In this particular example, the columns 640 are utilized to store EPC codes, logical reader identifiers (e.g., denoting the logical reader coverage area where the EPC data was acquired), time stamps, and flags that indicate whether a RFID tag is within a coverage area of a reader, respectively. The flag can be set based on incoming EPC (e.g., a sequence of EPC data periodically emitted by an RFID tag) data and/or by a transmitting reader (e.g., one of the readers 605), the server 610 and/or a photo-eye. It is to be understood that the columns 640 could be utilized to store more or less, and/or different information.

Respective rows 645 are associated with individual EPC codes. By way of example, a first row 650 includes an EPC code 110 . . . 0011, an associated logical reader identifier LR1, a timestamp of 12:35:00:00, and an "IN" flag that denotes the RFID tag entered the coverage area of the readers 605; a second row 655 includes an EPC code 101 . . . 1101, an associated logical reader identifier LR2, a timestamp of 12:35:05:30, and an "IN" flag that denotes the RFID tag entered the coverage area of the readers 605; and a third row 660 includes an EPC code 110 . . . 1010, an associated logical reader identifier LR2, a timestamp of 12:35:45:20, and an "OUT" flag that denotes the RFID tag left the coverage area of the readers 605. As described in detail below, a logical reader can be defined by one or more physical readers and associated antennas. The electronic data stored in the storage component 635 can be conveyed through an application interface 665 to an industrial control interface 670, which facilitates distributing the electronic data, via one or more PLC interfaces 680 and/or one or more industrial protocols 690, to one or more industrial systems 695.

Figure 7A:
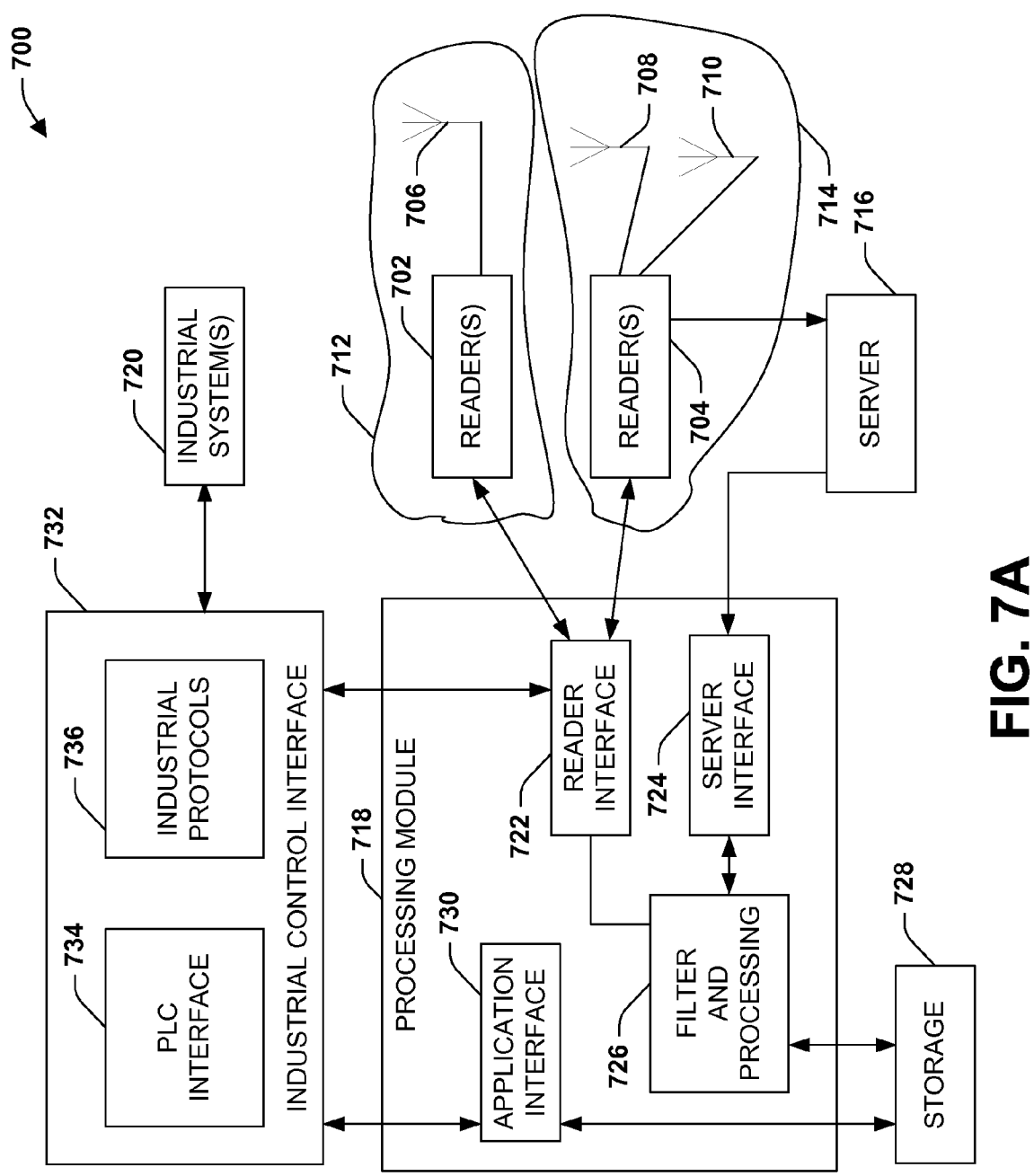
FIG. 7A illustrates an exemplary system that receives electronic data from various RFID readers and servers and provides the data to one or more industrial systems.
Figure 7B:
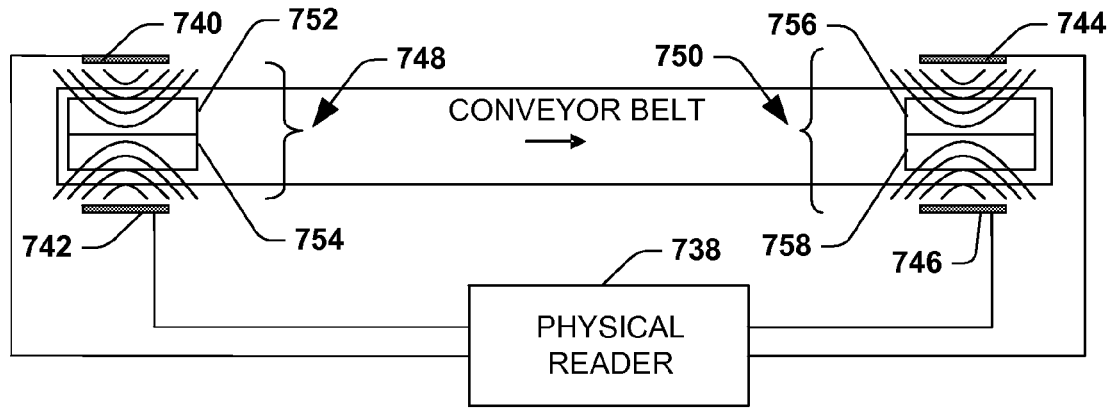
FIG. 7B illustrates an exemplary mapping between one physical reader and two logical readers.
Figure 7C:
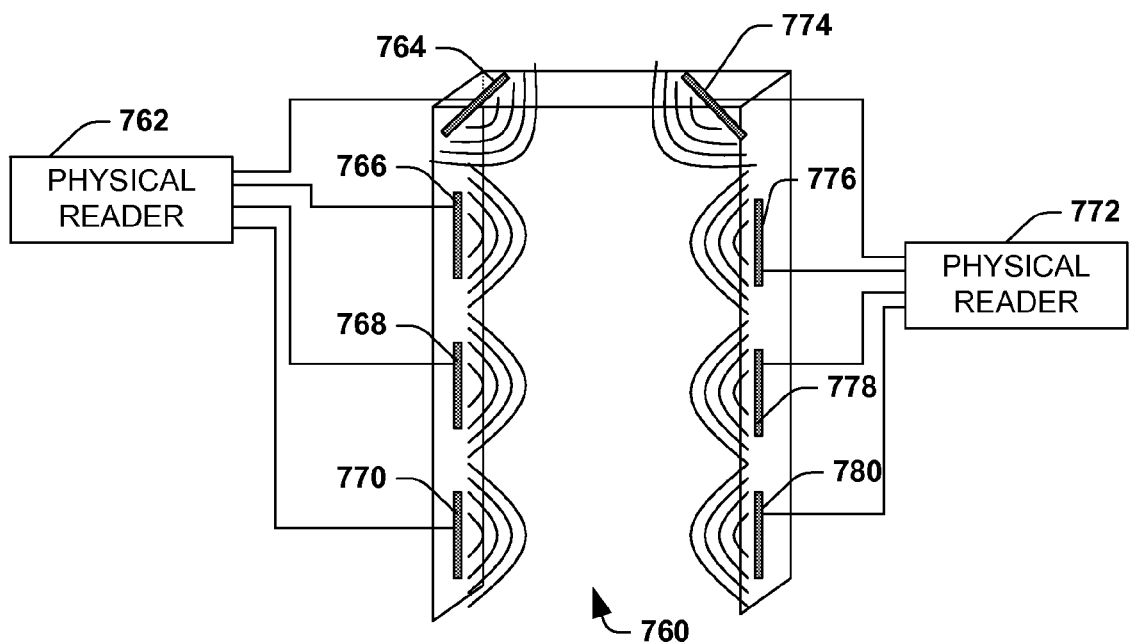
FIG. 7C illustrates an exemplary mapping between two physical readers and one logical reader.

FIG. 7 illustrates a system 700 that receives electronic data from various RFID readers and servers and provides the data to one or more industrial systems. The system 700 includes a physical RFID reader 702 and a physical RFID reader 704. However, it is to be understood that essentially any number of readers can be employed in accordance with the invention. The physical RFID readers 702 and 704 can individually be associated with one or more antennas, which can be respectively directed at an area in which to read data. In this example, the physical RFID reader 702 is associated with an antenna 706, and the physical RFID reader 704 is associated with an antenna 708 and an antenna 710. A logical RFID reader 712 can be formed from the physical RFID reader 704 and the antenna 706, and a logical RFID reader 714 can be formed by from the physical RFID reader 704 and the antennas 708 and 710. A reading from antenna 706 can be represented as a reading from the logical RFID reader 712, and a reading from antenna 708 and/or 710 can be represented as a reading from the logical RFID reader 714.

The system 700 further includes a server 716 that stores electronic product data. The electronic data stored within the server 716 can be uploaded and/or downloaded from a user and/or programmer's interface (not shown) and/or from the readers 702 and 704. Typically, electronic data received from the readers 702 and 704 is raw data, which can be filtered and processed within the server 716 before, during and/or after saving the electronic data. The electronic data within the server 716 can be stored as records within a database or other formats, for example, binary and ASCII. The electronic data read by the readers 702 and 704 and/or stored in the server 716 can be conveyed to a processing module 718 for storage and distribution to an industrial system(s) 720. The processing module 718 can include a reader interface 722 that can accept electronic data from the readers 702 and 704 as described herein. The processing module 718 further includes a server interface 724 that accepts electronic data from the server 716 as described herein. The server interface 716 can include interfaces to Savant-like servers.

The processing module 718 further includes a filter and processing component 726 that can filter electronic data to discriminate between electronic data and format the data. Suitable filtering includes recognizing and filtering duplicate readings. For example, when an RFID tag enters a range of one of the antennas 706, 708 and 710, the corresponding physical RFID reader (physical RFID reader 702 or physical RFID reader 704) periodically reads electronic data transmitted from the RFID tag and sends it to the processing module 718. In many instances, the reader reads duplicate electronic data emitted by the RFID tag. For example, the reader 702 can read the same EPC code multiple times per second. In another example, two RFID tags can be within the range of the antenna 706. In this instance, the reader 702 can read duplicate data from both RFID tags (e.g., EPC1, EPC2, EPC1, EPC1, EPC2 . . . ). Suitable filtering can recognize and discriminate between the two RFID tags. For example, the filtering can recognize that two tags with different electronic data entered the reader at a particular time and consider the mapping between physical and logical readers. The filter and processing component 726 can convey the electronic data to a storage component 728, and stored electronic data can be distributed to the industrial systems 720 through an application interface 730 and an industrial control interface 732 via various PLC interfaces 734 and/or industrial protocols 736, as described herein.

The following discussion provides two specific examples that further explain possible mappings between physical and logical RFID readers. It is to be appreciated that these examples are illustrative and do not limit the invention. A first example depicts a conveyor belt system with a physical reader 738 coupled to a plurality of antennas 740, 742, 744 and 746. The system further includes a logical reader 748 formed from the antennas 740 and 742, and a logical reader 750 formed from the antennas 744 and 746. The antenna 740, for example, can read a tag 752, a tag 754, or both tags 752 and 754 and, simultaneously, the antenna 742 can read the tag 754, the tag 752, or both tags 752 and 754. A filtration module (e.g., the filter and processing component 726) can determine the tags 752 and 754 have been read by the logical reader 748. Likewise, the antenna 744 can read a tag 756, a tag 758, or both tags 756 and 758 and, simultaneously, the antenna 746 can read the tag 758, the tag 756, or both tags 756 and 758. The filtration module can determine the tags 756 and 758 have been read by the logical reader 750. A second example depicts a location such as a dock door, wherein a single logical reader 760 is formed from a physical reader 762 and associated antennas 764, 766, 768 and 770 and a physical reader 772 and associated antennas 774, 776, 778 and 780. Utilizing several antennas can ensue that all tags going through the dock door (e.g., on pallets on a track) will be read. Some tags will be read by the antennas 764, 766, 768 and 770 (e.g., tags closer to these antennas), and some tags will be read by the antennas 774, 776, 778 and 780 (e.g., tags closer to these antennas). However, all tags go through the same area and, thus, belong to the same logical reader 760.

Figure 8:
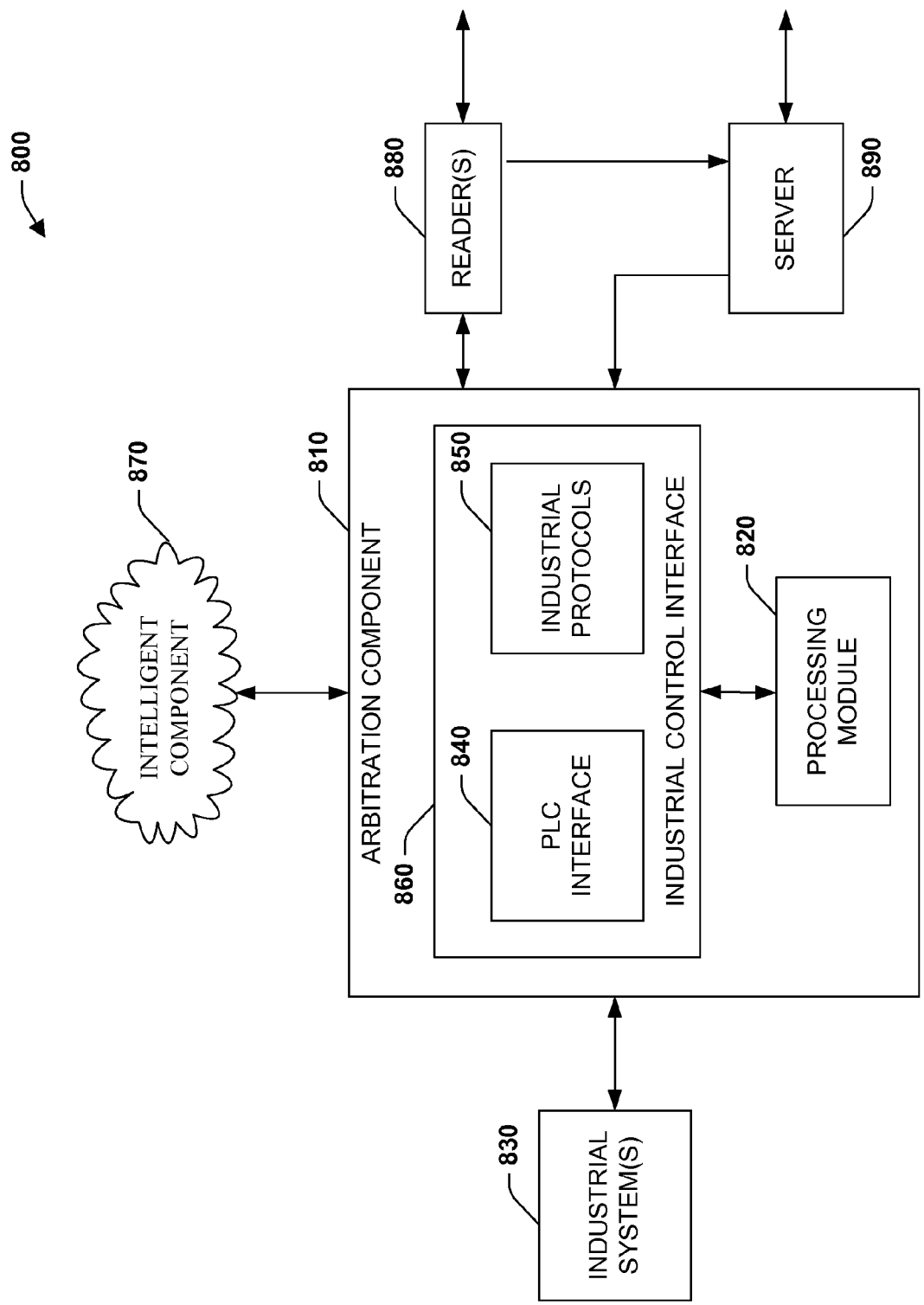
FIG. 8 illustrates an exemplary system that employs intelligence to facilitate distribution of electronic data to industrial control systems.

FIG. 8 illustrates a system 800 that employs intelligence to facilitate distribution of electronic data to industrial control systems. The system 800 includes an arbitration component 810 that collects, filters, and/or processes the electronic data via a processing module 820 and/or distributes the data to an industrial control system(s) 830 through various PLC interfaces 840 and/or industrial protocols 850 of an industrial control interface 860. The system 800 further includes an intelligent component 870 that facilitates collecting, filtering, processing and/or distributing data. For example, a plurality of RFID readers 880 can be associated with coverage areas, wherein individual readers can scan and read electronic data from one or more RFID tags within their respective coverage areas. Such data can be conveyed to the arbitration component 810. The intelligent component 870 can facilitate recognizing data (e.g., as raw or processed data, the logical reader coverage area, the physical reader . . . ) and directing it to the appropriate reader interface (not shown). Similarly, the intelligent component 870 can facilitate recognizing electronic data received from a server 890 and directing it to an appropriate server interface (not shown).

Upon receiving electronic data at an interface, the intelligent component 870 can facilitate determining whether the data should be filtered and/or formatted. Such filtering can include saving electronic data deemed to be desired and discarding remaining electronic data. The intelligent component 870 can then be utilized to facilitate storing the electronic data. For example, the intelligent component 870 can parse the electronic data and store respective portions within different fields. In one instance, such fields can be associated with a database table as described herein. The intelligent component 870 can facilitate conveying the stored electronic data to the industrial system(s) 830 as described herein. Such conveyance can be in accordance with agent subscriptions and/or queries, wherein the electronic data is provided to the industrial system(s) 830 based on a corresponding subscription or query.

It is to be appreciated that the intelligent component 870 can utilize statistics, heuristics, probabilities, historical data, costs, etc. in connection with facilitating the arbitration component 810 by performing a probabilistic and/or statistic-based analysis, which can be utilized to infer and/or render decisions. As utilized herein, the term "inference" and variations thereof generally refers to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Figure 9:
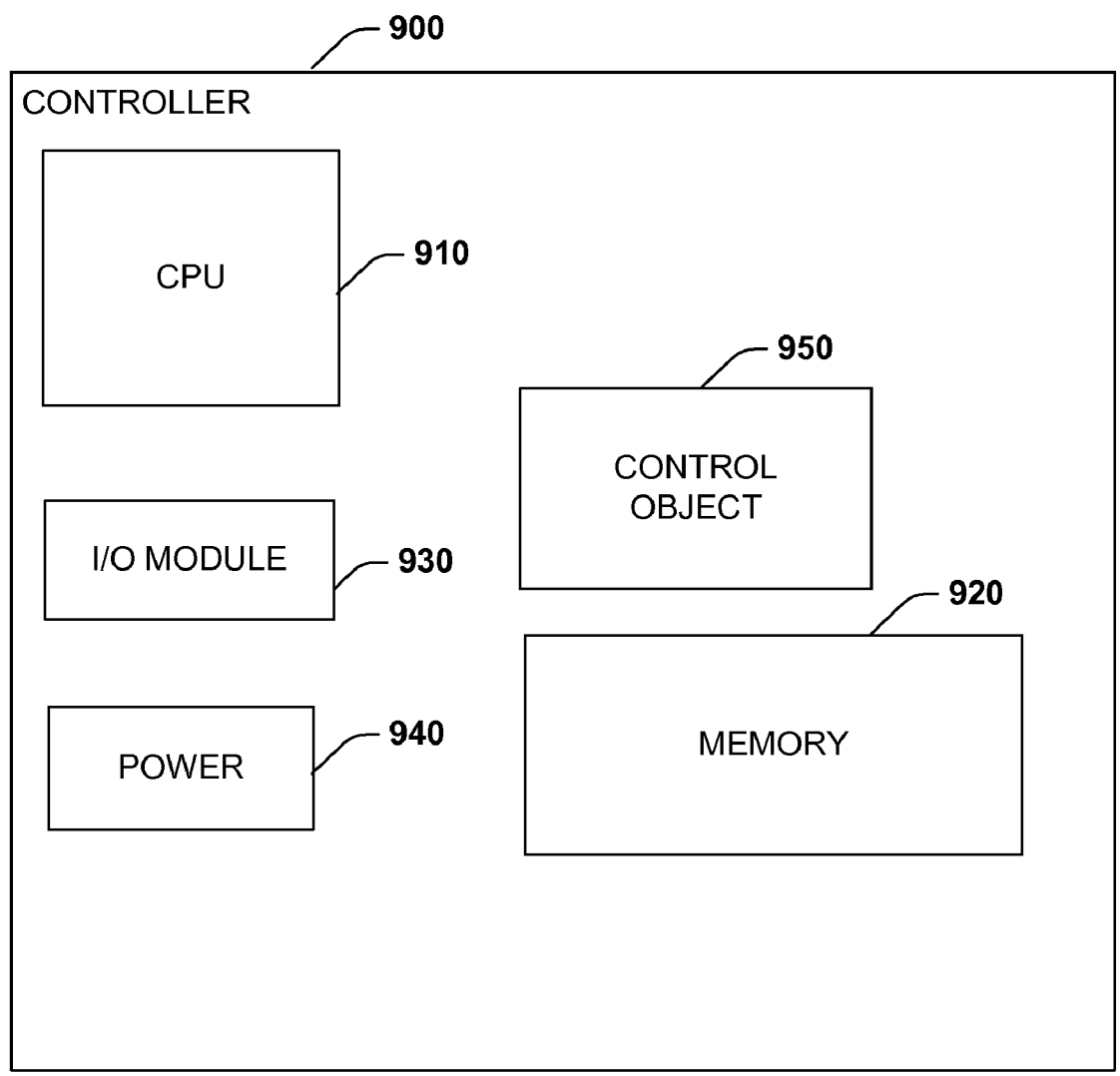
FIG. 9 illustrates an exemplary industrial controller.

FIG. 9 illustrates an industrial controller 900 in accordance with an aspect of the invention. The industrial device 900 can be an industrial controller, a programmable logic controller (PLC), and the like. As such, the industrial controller 900 can comprise one or more modules such as a processing module 910, a memory module 920, and an I/O module 930, and a power component 940 to energize components therein. The processing module 910 can be utilized to execute control applications, end-user programs and associated instructions, which can be stored within the memory module 920 or memory external to the industrial controller 900. The I/O module 930 provides communication with the environment. For example, an input channel can be employed to receive analog and digital signals through sensors, switches and the like to provide information indicative of state and/or relating to a process, whereas an output channel can be utilized to convey a next state to an entity under the control of the controller. The controller 900 further includes a control object 950, which can includes a processing module (not shown) and an industrial control interface (not shown), to facilitate the exchange of electronic data obtained from RFID tags (not shown) and the controller 900, as well as other industrial control components (not shown), as described herein.

FIGS. 10-13 illustrate methodologies, in accordance with an aspect of the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that one or more of the methodologies could alternatively be represented as a series of interrelated states or events, such as in a state diagram. Moreover, not all illustrated acts may be required to implement the methodologies in accordance with the present invention.

Figure 10:
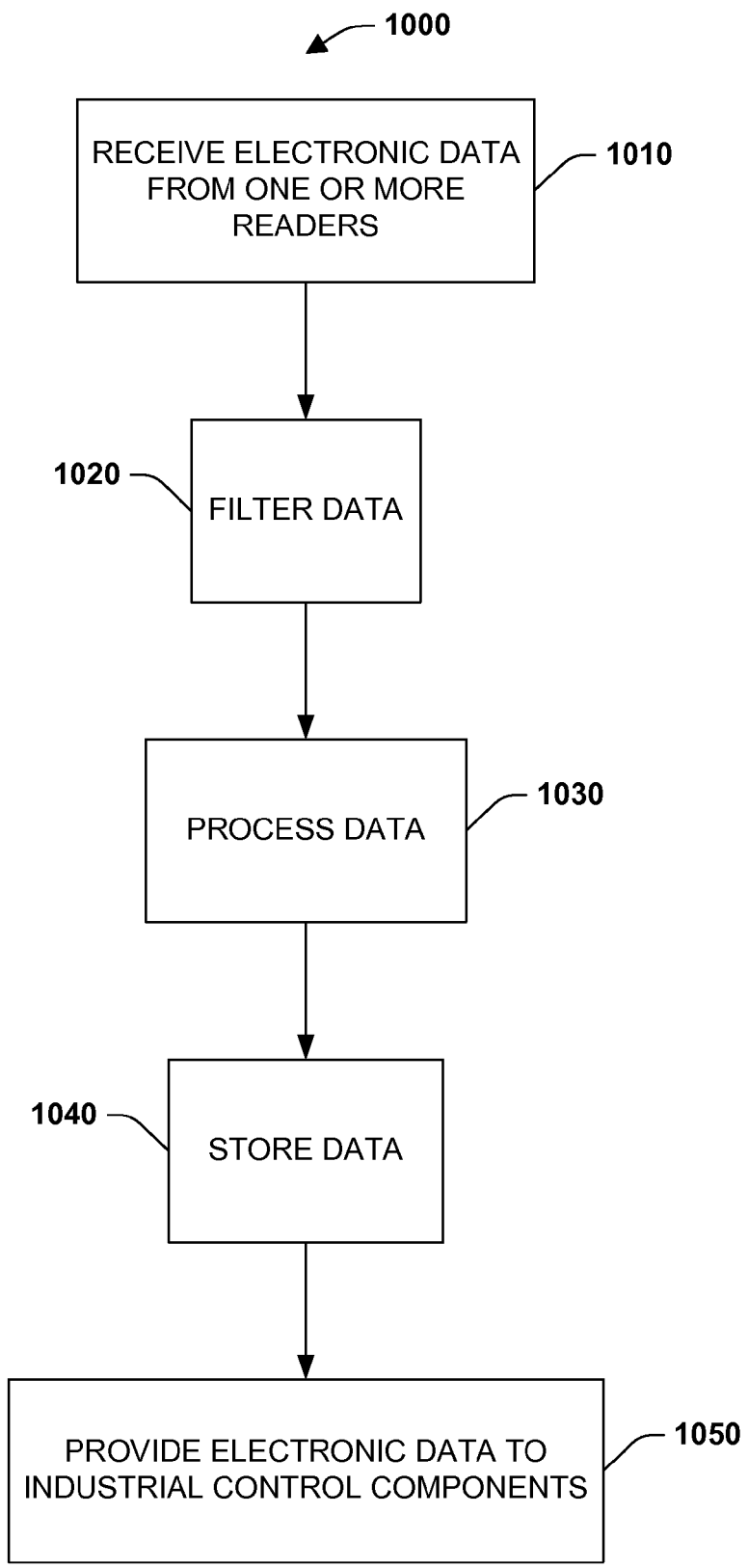
FIG. 10 illustrates an exemplary method for distributing electronic data received from RFID readers to entities of industrial control systems.

FIG. 10 illustrates a method 1000 for distributing electronic data received from RFID readers to entities of industrial control systems. At 1010, electronic data (e.g., unprocessed and processed) from one or more RFID tags is received. The electronic data can be indicative of an EPC code, a logical reader, a timestamp, a signal quality indicator, a flag indicating whether an RFID tag is within a coverage area, a product type, a date of manufacture, a lot number, case information, pallet information, and/or container levels information, for example. In addition, the electronic data can be provided by an RFID reader that scanned the RFID tag. Such readers typically are associated with logical reader, wherein individual readers can employ one or more antennas to scan one or more RFID tags. In addition, one or more readers can scan similar and/or different coverage areas and, thus, more than one reader can obtain data from a single RFID tag. The electronic data from the reader can be received by one or more reader interfaces, for example, an RFID reader plug-in associated with the manufacturer of the reader. Typically, conveyance of the electronic data is through an Ethernet connection utilizing a communication protocol supported by the reader manufacturer.

At 1020, the electronic data is filtered. Such filtering includes recognizing and filtering duplicate readings. For example, when an RFID tag enters a range of an antenna of a reader, the reader begins to periodically read the electronic data from the RFID tag and send the read data. In many instances, the reader reads duplicate electronic data emitted by the RFID tag (e.g., the same EPC code, for example, 100 readings of the same EPC per second). In another example, two RFID tags can be within the range of the antenna. In this instance, the reader can read duplicate data from both RFID tags (e.g., EPC1, EPC2, EPC1, EPC1, EPC2 . . . ). The filtering can recognize that two tags with different electronic data entered the reader at a particular time and consider the mapping between physical and logical readers. At reference numeral 1030, the electronic data is processed. Such processing includes formatting the electronic data for subsequent storage, recognizing electronic product data of interest, etc. At 1040, the electronic data is stored. In one instance, the electronic data is stored as records in a table, wherein individual rows are utilized to delineate related electronic data across fields, or columns. In one particular example, individual fields can store an EPC code, a logical reader identifier, a timestamp, a flag that indicates whether a RFID tag is within a coverage area, etc.

At reference numeral 1050, stored electronic data is provided to one or more components of the industrial control system. Conveyance of such data can be in response to a subscription (e.g., a Subscribe Interaction Protocol) by the component to receive electronic data information and/or signal quality information whenever an RFID tag enters a coverage area. In another instance, one or more of the components can automatically receive such information. In yet another example, intelligence can be employed to determine when or if received and/or stored electronic data should be conveyed to the component. In still another example, conveyance can be in response to a request for historical information.

Figure 11:
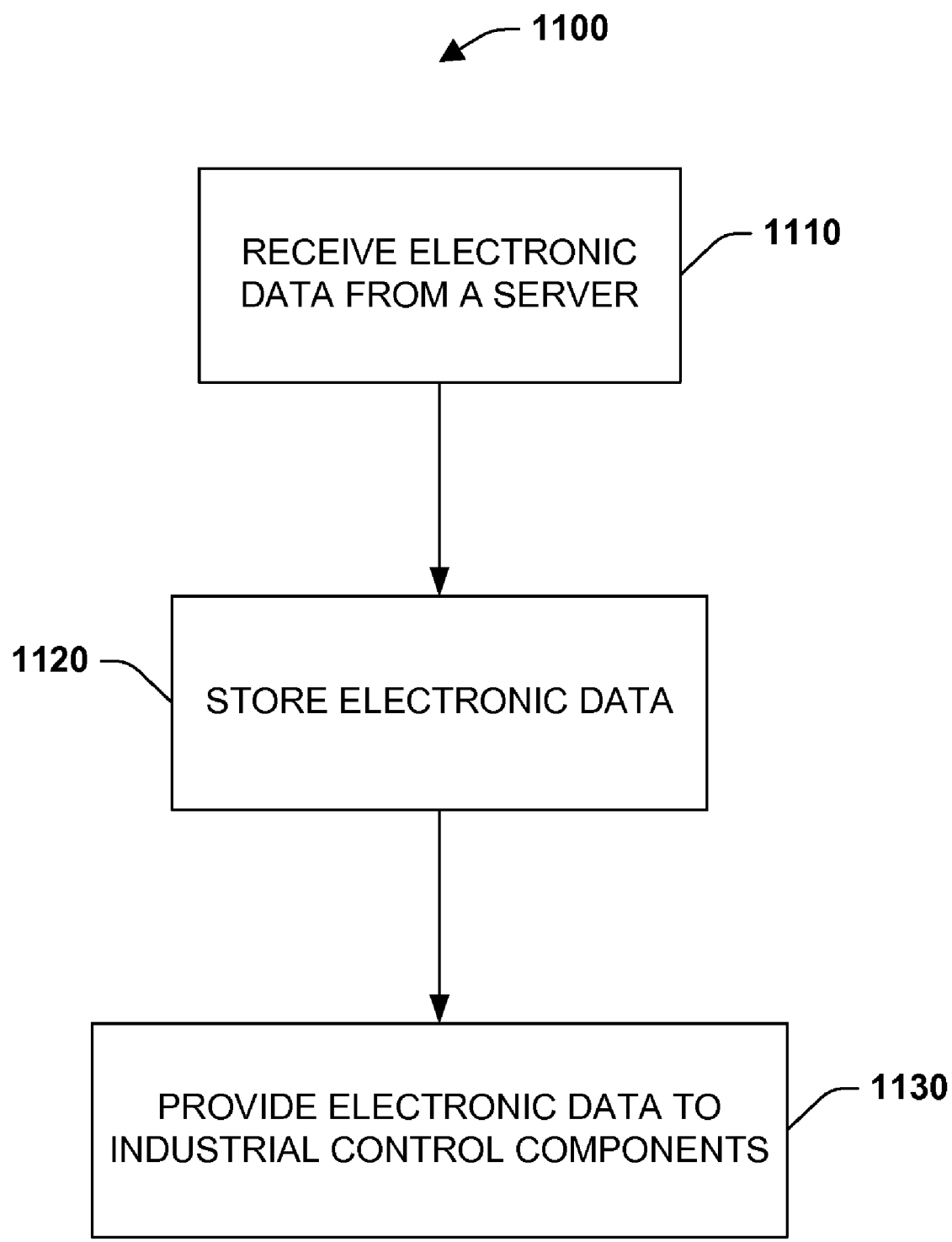
FIG. 11 illustrates an exemplary method for distributing electronic data obtained from a server to components within an industrial control system.

FIG. 11 illustrates a method 1100 for distributing electronic data obtained from a server to components within an industrial control system. At reference numeral 1110, electronic data from a server is received. For example, a server interface can be provided to receive EPC and/or other electronic data from an associated server. Typically, such data is formatted and stored, for example, within records of a database associated with the server. In these instances, the formatted data, or records, can be conveyed to the server interface. Typically, the data is conveyed through an Ethernet connection utilizing a communication protocol supported by the server. However, it is to be appreciated that any wire and/or wireless connection can be utilized in accordance with aspects of the invention.

At 1120, the electronic data can be stored. If desired, prior to storage the data can be filtered and/or processed. However, data received from a server typically has been filtered and processed and, thus, additional filtering and processing may or may not be desired. In one example, the data is stored as records in a table. As such, individual rows can include one or more fields that store particular portions of the data. For example, individual fields can store an EPC code, a logical reader identifier, a timestamp, a flag that indicates whether a RFID tag is within an antenna's coverage area, etc. At reference numeral 1130, stored data can be provided to one or more components of the industrial control system. Conveyance of such data can be in response to a subscription and/or query.

Figure 12:
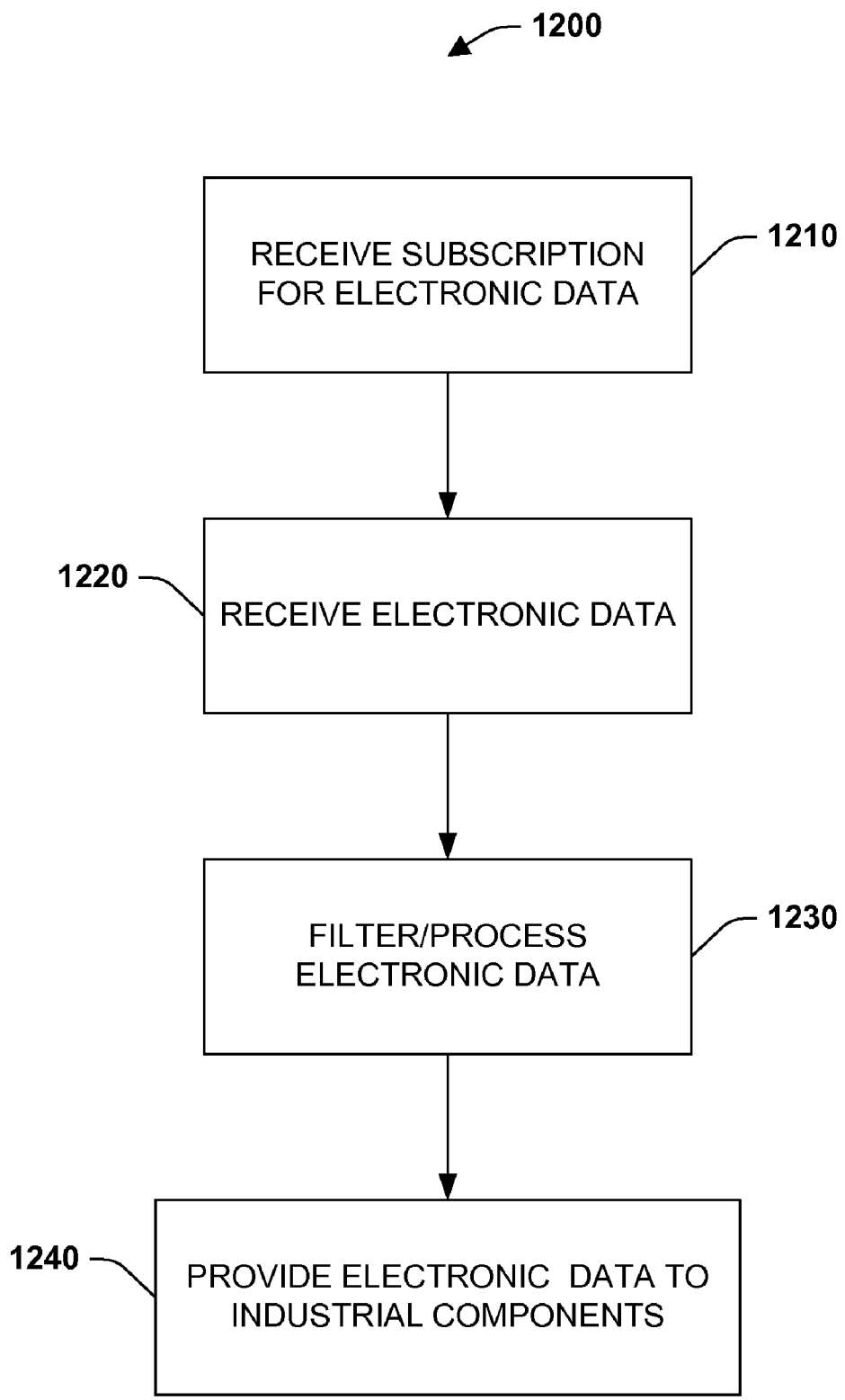
FIG. 12 illustrates an exemplary method that provides electronic data to components in an industrial control system.
Figure 13:
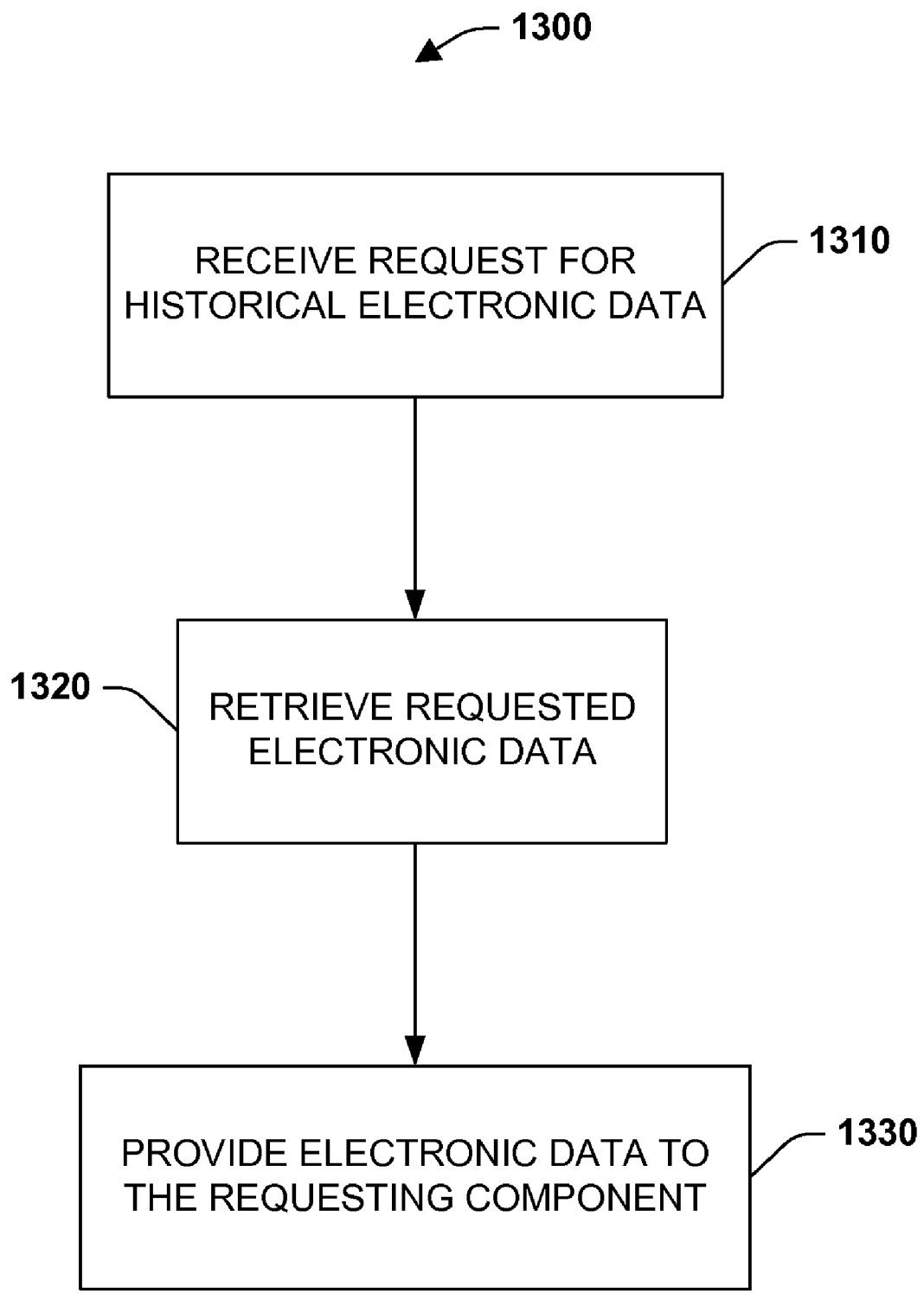
FIG. 13 illustrates an exemplary method for a component of an industrial system to retrieve electronic product data.

FIG. 12 illustrates a method 1200 that provides electronic data to components in an industrial control system. At reference numeral 1210, one or more components subscribe to receive electronic data when an RFID tag enters a coverage area. At 1220, electronic data received from a reader and/or a server. At 1230, the electronic data is filtered, processed and/or stored as described herein. At 1240, the electronic data is provided to subscribed component. FIG. 13 illustrates a method 1300 for a component of an industrial system to retrieve electronic product data. At reference numeral 1310, one or more components issue a query for electronic data. The query can be a request for historical data from a database. For example, the query can be to get all data read within a particular time period (e.g., between two timestamps). In another example, the query can be for a list of timestamps corresponding to particular electronic data. At 1320, the data can be retrieved, and at 1330, the requested data is provided to the requesting component.

Figure 14:
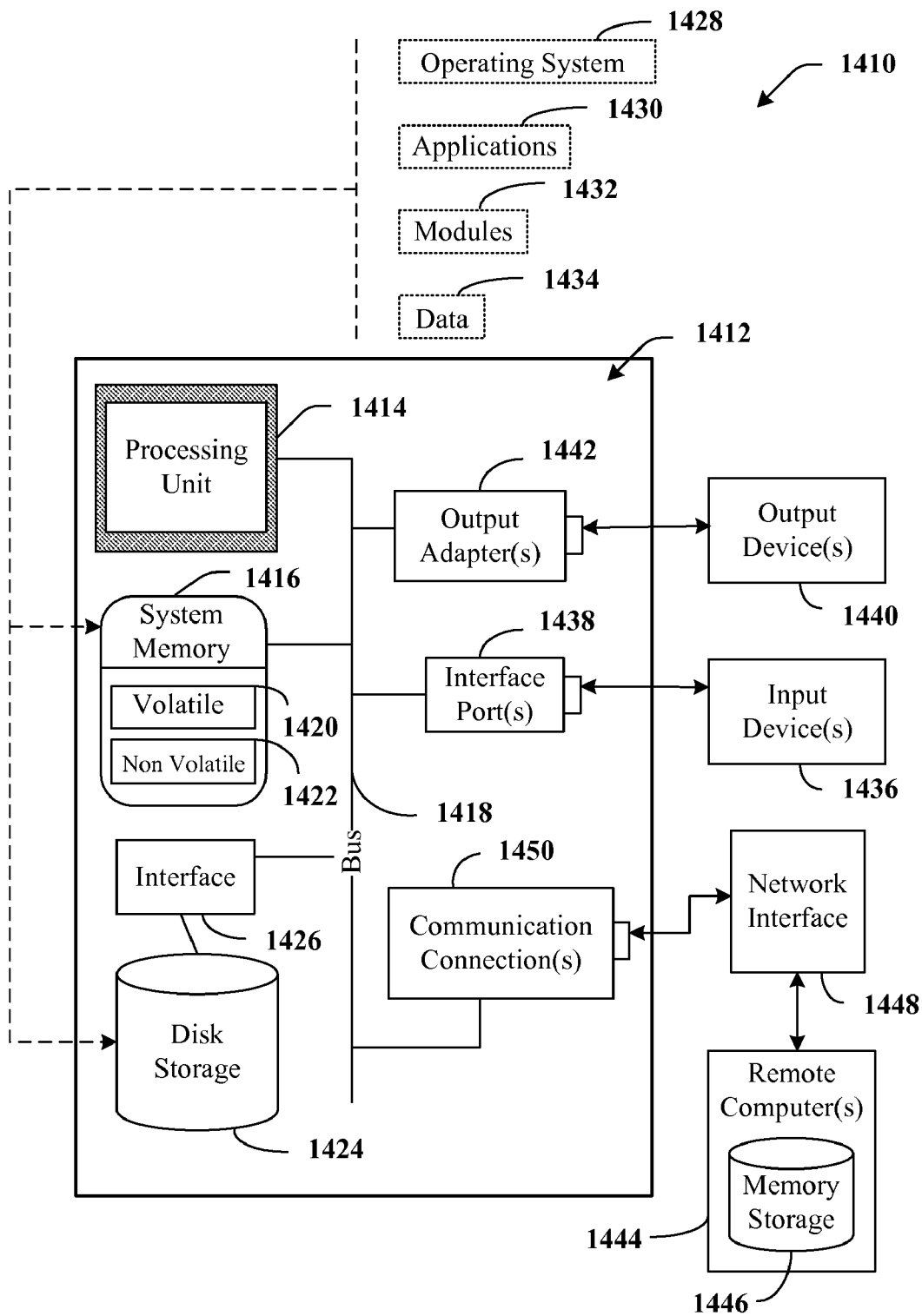
FIG. 14 illustrates an exemplary computing architecture that can be employed in connection with the subject invention.
Figure 15:
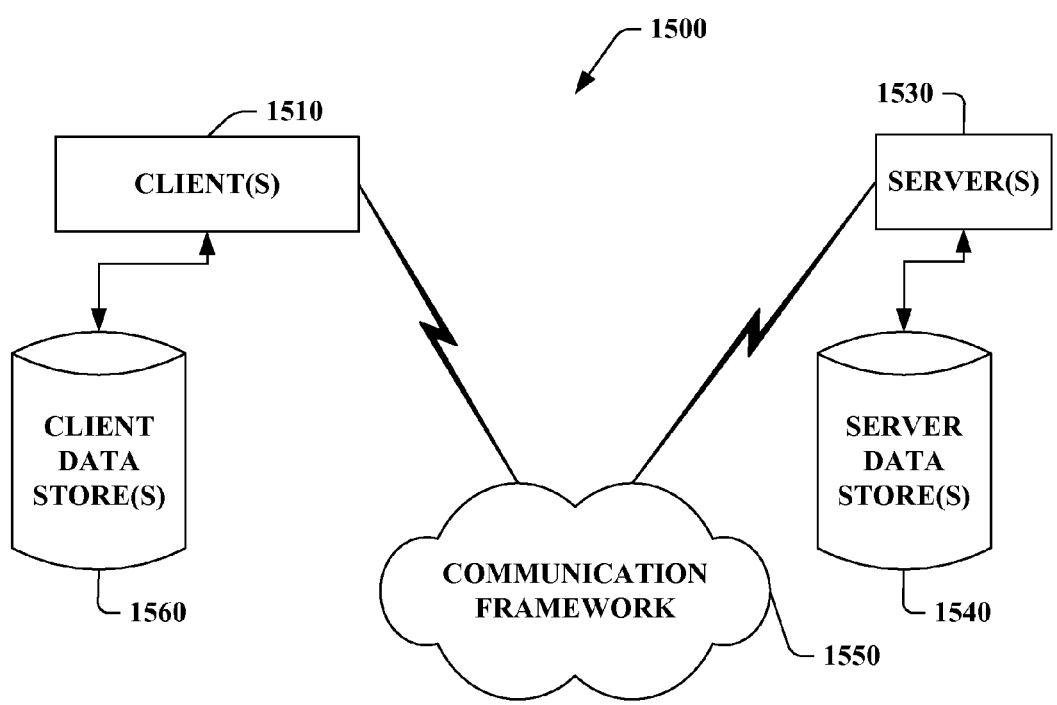
FIG. 15 illustrates an exemplary networking environment that can be employed in connection with the subject invention.

In order to provide a context for the various aspects of the invention, FIGS. 14 and 15 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412 and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE-1102.3, Token Ring/IEEE-1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

FIG. 15 is a schematic block diagram of a sample-computing environment 1500 with which the present invention can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The servers 1530 can house threads to perform transformations by employing the present invention, for example. One possible communication between a client 1510 and a server 1530 can be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s) 1530 are operably connected to one or more server data store(s) 1540 that can be employed to store information local to the servers 1530.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application.

Furthermore, to the extent that the terms "includes," and "including" and variants thereof are used in either the detailed description or the claims, these terms are intended to be inclusive in a manner similar to the term "comprising."

What is claimed is:

1. An industrial controller, comprising:
 a processing module configured to exchange electronic product data with at least one radio frequency identification (RFID) reader and filter the electronic product data;
 a memory configured to store the electronic product data filtered by the processing module in a structured format; and
 an industrial control interface configured to exchange the electronic product data filtered by the processing module stored in the structured format with at least one entity of an industrial control system.

2. The industrial controller of claim 1, wherein the electronic product data comprises at least one of an Electronic Product Code, a logical reader identifier, a timestamp, a flag indicating an RFID tag is with an antenna's coverage area, a product type, a date of manufacture, a lot number, an associated case, an associated pallet, or an associated container level.

3. The industrial controller of claim 1, wherein the industrial controller is a programmable logic controller (PLC).

4. The industrial controller of claim 3, wherein the industrial control interface is further configured to at least one of read or write at least one of an In, an Out, an InOut, a tag, a state, or a status parameter to the PLC.

5. The industrial controller of claim 1, wherein the industrial control interface is further configured to employ at least one industrial protocol to exchange the electronic data with the at least one entity.

6. The industrial controller of claim 5, wherein the at least one entity is a control application of the industrial controller.

7. The industrial controller of claim 5, wherein the at least one industrial protocol includes control and information protocol (CIP).

8. The industrial controller of claim 1, wherein the at least one entity is external to the industrial controller.

9. The industrial controller of claim 8, wherein the at least one entity is associated with at least one of an Enterprise System (ERP), a Manufacturing Execution System (MES), or a Machine Control System (MC).

10. The industrial controller of claim 1, wherein the structured format is at least one of a table, an in-memory database or a database system.

11. The industrial controller of claim 1, wherein the structured data format includes logic.

12. The industrial controller of claim 1, further comprising an intelligent component configured to employ at least one of statistics, probabilities, inferences, or classifiers to facilitate at least one of electronic product data collection, filtering, formatting, storage, or distribution to an agent.

13. The industrial controller of claim 1, electronic product data includes a timestamp.

14. The industrial controller of claim 1, further comprising:
 an RFID interface configured to receive the electronic product data from the at least one RFID reader.

15. The industrial controller of claim 14, wherein the RFID interface is further configured to employ at least one plug-in driver to receive the electronic product data from the at least one RFID reader.

16. The industrial controller of claim 14, wherein the RFID interface is further configured to utilize at least one of a wired connection or wireless connection to receive the electronic product data from the at least one RFID reader.

17. The industrial controller of claim 1, wherein the structured data format includes at least one flag.

18. The industrial controller of claim 14, wherein the industrial controller receives at least one of a subscription or a request from the at least one entity.

19. The industrial controller of claim 18, wherein the request is for at least one of historical electronic product data or a signal quality indicator associated with reception of the electronic product data.

20. A method, comprising:
   interfacing with at least one Radio Frequency Identification (RFID) reader through an RFID reader interface of an industrial controller;
   obtaining electronic product data related to at least one RFID product tag from the RFID reader;
   filtering the electronic product data;
   formatting the filtered electronic product data in a structured form;
   interfacing with at least one entity of an industrial control system through an industrial control interface of the industrial controller utilizing at least one industrial protocol; and
   conveying the electronic product data in the structured form to the at least one entity.

* * * * *